(12) United States Patent
Habib

(10) Patent No.: US 12,478,321 B2
(45) Date of Patent: Nov. 25, 2025

(54) METHODS AND APPARATUSES FOR SENSING AND RELIEVING STRESS

(71) Applicant: Umay Care Holdings Inc., Edmonton (CA)

(72) Inventor: Alikhan Habib, Edmonton (CA)

(73) Assignee: Umay Care Holdings Inc., Edmonton (CA)

(*) Notice: Subject to any disclaimer, the term of this patent is extended or adjusted under 35 U.S.C. 154(b) by 505 days.

(21) Appl. No.: 17/085,775

(22) Filed: Oct. 30, 2020

(65) Prior Publication Data

US 2021/0128058 A1 May 6, 2021

Related U.S. Application Data

(60) Provisional application No. 62/930,526, filed on Nov. 4, 2019.

(51) Int. Cl.
*A61H 23/00* (2006.01)
*A61B 5/00* (2006.01)
(Continued)

(52) U.S. Cl.
CPC .......... *A61B 5/4836* (2013.01); *A61B 5/0004* (2013.01); *A61B 5/0015* (2013.01);
(Continued)

(58) Field of Classification Search
CPC ....... A61B 5/4836; A61B 5/0004; A61B 5/01; A61B 5/024; A61B 5/08; A61B 5/1102;
(Continued)

(56) References Cited

U.S. PATENT DOCUMENTS

2015/0057701 A1* 2/2015 Kelleher ............ A61H 23/0245
606/204.15
2015/0305974 A1* 10/2015 Ehrenreich .......... A61B 5/6833
601/46

(Continued)

FOREIGN PATENT DOCUMENTS

WO WO-2017197496 A1 * 11/2017 ............. A61F 7/007
WO WO-2018013835 A1 * 1/2018

*Primary Examiner* — Margaret M Luarca
*Assistant Examiner* — Sarah B Lederer
(74) *Attorney, Agent, or Firm* — Bookoff McAndrews, PLLC

(57) ABSTRACT

Systems, devices, and methods are provided for delivering stress-relieving therapy. A treatment system can include one or more treatment units, a housing having a hollow interior and upper and lower surfaces, one or more treatment devises within the housing, a processor configured to control the one or more treatment devices, and a bridge having two connectors. The one or more treatment devices can include a vibratory motor, heating device, cooling device, light emitting diode, lighting device, one or more speakers, or a combination thereof, configured to generate thermal therapy, haptic and vibrational therapy, visual therapy, binaural therapy. The therapy can be further generated as bilateral stimulation. The stress treatment assembly can be configured with one or more treatment units containing one or more sensors to measure real-time biometric signals and information from a user using the stress treatment assembly.

38 Claims, 18 Drawing Sheets

(51) Int. Cl.
   *A61B 5/01*   (2006.01)
   *A61B 5/024*  (2006.01)
   *A61B 5/08*   (2006.01)
   *A61B 5/11*   (2006.01)
   *A61H 23/02*  (2006.01)
   *A61F 7/00*   (2006.01)
   *A61M 21/00*  (2006.01)

(52) U.S. Cl.
   CPC ............... *A61B 5/01* (2013.01); *A61B 5/024* (2013.01); *A61B 5/08* (2013.01); *A61B 5/1102* (2013.01); *A61B 5/4884* (2013.01); *A61B 5/6819* (2013.01); *A61B 5/6821* (2013.01); *A61B 5/7285* (2013.01); *A61H 23/02* (2013.01); *A61B 2562/0219* (2013.01); *A61B 2562/0271* (2013.01); *A61F 2007/0004* (2013.01); *A61H 2201/0221* (2013.01); *A61H 2201/10* (2013.01); *A61H 2230/065* (2013.01); *A61H 2230/405* (2013.01); *A61M 2021/0022* (2013.01); *A61M 2021/0027* (2013.01); *A61M 2021/0044* (2013.01); *A61M 2021/0055* (2013.01); *A61M 2021/0066* (2013.01)

(58) Field of Classification Search
   CPC . A61B 5/6819; A61B 5/6821; A61B 5/02055; A61H 2201/10; A61H 5/00; A61H 23/00; A61M 2021/0022; A61M 2021/0066; A61F 9/04
   See application file for complete search history.

(56) References Cited

U.S. PATENT DOCUMENTS

| | | | | |
|---|---|---|---|---|
| 2017/0165485 | A1* | 6/2017 | Sullivan | A61B 5/0022 |
| 2018/0116528 | A1* | 5/2018 | Tzvieli | A61B 5/165 |
| 2018/0256432 | A1* | 9/2018 | Mayo | A61H 1/00 |
| 2019/0307983 | A1* | 10/2019 | Goldman | A61B 5/165 |

* cited by examiner

Treatment Unit
100

METHODS AND APPARATUSES FOR SENSING AND RELIEVING STRESS

CROSS-REFERENCE TO RELATED APPLICATIONS

This application claims the benefit of U.S. Provisional Application No. 62/930,526, filed Nov. 4, 2019, which is hereby incorporated by reference in its entirety.

FIELD OF THE INVENTION

The invention is directed to devices for delivering stress-relieving therapy including thermal, vibrational, audio, and light therapy. In some cases, the devices may include sensors for measuring physiological parameters and a feedback loop which adjusts the therapy in relation to the measured physiological parameters.

BACKGROUND OF THE INVENTION

Today, the average person spends over 10 hours a day on digital devices including computers, televisions, and mobile devices such as smartphones. While such a high level of accessibility and use of these devices have brought many benefits to society, so has an increase of fatigue and stress to the users of these devices, particularly to the mind and body. The stress experienced by today's habits and use of digital devices can be manifested mentally such as emotional and intellectual stress. The stress caused by extended use of digital devices can also be manifested physically with symptoms such as having eye strain, dry eye, eye allergies, puffy eye, head and body fatigue, headaches, migraines, etc.

Currently, there have been attempts to relieve physical symptoms through various methods and devices. For example, devices and methods have been used to heat or cool either the body or head of a user. Other devices and methods can include gel packs or thermal packs that can be applied directly or indirectly with padding of common household items to the eye. In another example, devices and methods have been used to create physical stimulation on the body by having a user wear a physical device on the user's body. For example, some of these devices may use electrocardiograms (or ECG's) to detect a heartrate of a user and apply the information to determine the user's stress level.

However, the devices mentioned above, for example, can either only perform sensing techniques for a diagnosis and require the user to apply a different application for the stress relief itself or the device can only generate stimulations on the user but does not accommodate personal settings based on a user's physiological profile.

Further, the devices and methods mentioned above are either too bulky to use, hard to use, usable only under strict requirements such as having to be worn in a particular way on the body or hand and wrist, or uncomfortable due to all-purpose solutions not accounting for a person's individual and unique eye and head profile, or a combination of the above. For example, gel packs generally require a container to hold the gel pack which can cause discomfort to the user since gel packs are not designed to be compatible with the anatomy of an eye region. And for example, battery operated heaters generally require a surgical compress to be heated which causes the heater to only indirectly heat the user's eye and can cause discomfort. In these cases, a physician or technician is generally required to monitor the electrical heaters to prevent burning or some kind of permanent damage. Other physical obstacles and practical constraints can prevent a user from having an easy-to-use device and application.

And even further, the current attempts fail to provide relief to either mental symptoms or both physical and mental symptoms from extensive use of digital devices. For example, failure to blink regularly, due to staring extensively at a computer screen for long periods of time, can cause drying and straining of eyes, as well as increase in stress. Additionally, environmental conditions can contribute to aggravating the dry eye and eye strain such as exposure to smoke, wind, or other dry climates.

Thus, a device, system, and method of determining stress and providing stress-therapy to relieve both physical and mental symptoms is desired with today's use of digital devices.

SUMMARY OF THE INVENTION

The present application relates generally to apparatuses, devices, systems, and methods for applying thermal, vibrational, audio, and/or light treatment to the eye region or other areas of the body by the application or removal of one or more of thermal energy, one or more vibrational motors, LED lights, audio sources, or both thermal and vibrational therapy at the same time. In some cases, such therapy will be based on data received by sensors including one or more of infrared LEDs and light detectors, thermistors, accelerometers, gyroscopes, EEGs, EKGs, microphones, and electrodermal activity sensors (also known as galvanic skin response sensors).

According to an example of the present application, there is provided a stress treatment assembly including two treatment units each having an upper shell and a lower shell, the two treatment units can generate thermal energy to provide a heated or cooled lower surface, audio signals for providing binaural stimulation, vibrational energy from vibrational motors, light energy for biometric sensing and light stimulation, or a combination thereof concurrently, a bridge connecting the two treatment units. In one example, the vibrational energy can be generated by vibrational motors, actuators, haptic motors for massaging capabilities, or a combination thereof. The thermal energy can be generated by a thermoelectric cooler (TEC), radio frequency treatments, or by flexible heaters for temperature stimulation.

In some examples, the stress treatment assembly is used with the user lying face up and the stress treatment assembly resting on the user's eyelids. In some examples, an optional attachment member is provided for attaching the stress treatment assembly to the head, allowing use of the stress treatment assembly when the user is not lying down. In one example, each of the two treatment units can be used simultaneously for a user's eyes. In another example, one of the two treatment units can be active while the other treatment unit is inactive. The active treatment unit can be used to provide therapy for one eye. In one example, one or more treatment units of the two treatment units can be used in a hand of the user or on another part of the user's body such that the user can hold the treatment unit as a pod. In one example, the two treatment units can be detached from the bridge such a first one treatment unit can be used for one eye of the user while a second treatment unit can be inactive or can be used on the user's hand concurrently with the first treatment unit.

According to an example of the present application, there is provided a treatment unit, the treatment unit can include an upper shell, a mounting board, a lower shell, a thermoelectric cooler (TEC) for generating thermal energy, a printed circuit board (PCB) for controlling the device, a heatsink for dissipating thermal energy into the upper shell. In one aspect, one or more heatsinks can be configured with patterns made of various grooves, ridges, ribs, or a combination thereof to dissipate heat, such that the heat can be optimally dissipated, dissipated in a controlled matter, dissipated in a pattern, or a combination thereof. In another aspect, the treatment unit can also include a vibration unit having vibration motors for generating vibrational therapy, LED's for generating light therapy and sensing biometrics such as heart rate and respiratory patterns, speakers for outputting audio signals for generating binaural stimulation and other audio therapy, or a combination thereof.

According to an example of the present disclosure, there is provided an stress treatment assembly including one or more treatment units, the one or more treatment units can generate thermal energy to provide a heated or cooled treatment surface for the eyelids of a user when worn or other parts of the body such as hands, when held, or fingers, when worn as a ring, and in some examples a bridge connecting the two treatment units. In another aspect, the stress treatment assembly can also include a vibration unit having vibration motors for generating vibrational therapy, LED's for generating light therapy and sensing biometrics such as heart rate and respiratory patterns, speakers for outputting audio signals for generating binaural stimulation and other audio therapy, or a combination thereof.

According to an example of the present disclosure, there is provided a treatment unit, comprising: an upper shell, a lower shell, a mounting board, a thermoelectric cooler (TEC) for generating thermal energy, a processor, or controller, or both, for controlling the TEC, a heatsink for dissipating thermal energy into the upper shell in some examples having one or more ribs, ridges, and grooves, or a combination thereof such that the ribs, ridges, and grooves create a pattern in the heatsink which can be configured to optimally dissipate heat, dissipate heat in a controlled manner, dissipate heat in a desired pattern, or a combination thereof. The TEC, the heatsink, and the processor, or controller, or both, can be contained within the upper shell and the lower shell. In another aspect, the treatment unit can also include a vibration unit having vibration motors for generating vibrational therapy, LED's for generating light therapy and sensing biometrics such as heart rate and respiratory patterns, speakers for outputting audio signals for generating binaural stimulation and other audio therapy, or a combination thereof.

In one aspect, the stress treatment assembly or treatment unit can be configured with ancillary devices such as a mobile phone having an application and user interface configured to control the stress treatment assembly or treatment unit. The stress treatment assembly can also be configured with multiple charging ports and interfaces and be configured with wireless communication capability with the mobile device. In one example, each treatment unit can wirelessly communicate information to each other through a wireless connection such as Wi-Fi, Bluetooth, etc. In one aspect, the stress treatment assembly, or each treatment unit, can be wirelessly charged with an inductive charging coil to an inductive charging device. In one aspect, the stress treatment assembly can be configured with an aromatherapy device that can dissipate a fragrance in a controlled manner.

According to an example of the present disclosure, the stress treatment assembly can be configured with one or more treatment units containing one or more sensors to measure real-time biometric signals and information from a user using the stress treatment assembly. For example, the one or more treatment units can each include infrared LED's or other light detectors configured to sense and measure heart rate, breathing rate, or other respiratory patters of the user. In another example, the one or more treatment units can be configured with a thermistor configured to measure temperature. In one example, the one or more treatment units can each include accelerometers, gyroscopes, inertial measurement units (IMU's), etc., to measure respiratory waveforms and heart rate of the user by detecting motion of the user, in some examples, using ballistocardiography. In one example, the sensed signals from the accelerometer, gyroscope, IMU's, or a combination thereof can be used to supplement the biometric sensing signals from the LED's. In one example, the one or more treatment units can be configured with one or more microphones configured to receive audio signals for determining respiratory rate. In one example, the one or more treatment units can be configured with an ECG/EKG or electroencephalography (EEG), and electrical brain activity capabilities.

BRIEF DESCRIPTION OF THE DRAWINGS

Examples of the present invention will now be described by way of example with reference to attached figures, wherein.

DETAILED DESCRIPTION

Figure 1:
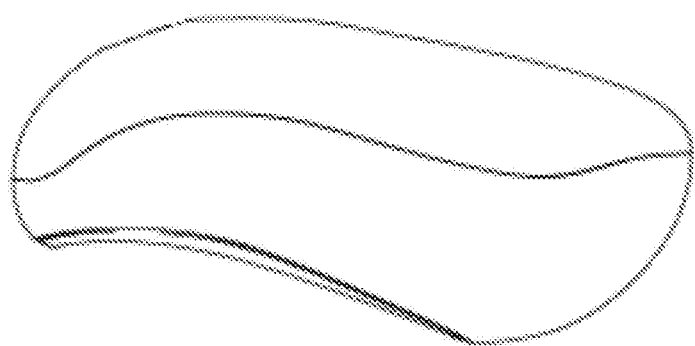
FIG. 1 illustrates a side view of one assembled treatment unit.

Reference will be made below in detail to exemplary examples of the invention, examples of which are illustrated in the accompanying drawings. Wherever possible, the same reference numerals used throughout the drawings refer to the same or like parts.

The following discussion relates to devices, systems, and methods for relieving stress and providing stress therapy. For example, the discussion below generally relates to devices, systems, and methods for thermal therapy as well as additional modalities of therapy and stimulation for relieving stress, fatigue, and other symptoms caused by stress such as dry eye, eye strain, puffy eye, headaches, allergies, migraines, dizziness, nausea, as well as other mental, emotional, or intellectual stress. Other benefits of using the currently described devices, system, and methods can include improving and optimizing rest and energy, improving meditation and focus, restorative sleep, heart rate variability, improving cognitive performance and focus, de-stressing, reducing anxiety, and post traumatic stress disorder.

FIG. 1 illustrates a side view of an assembled treatment unit 100.

Figure 2:
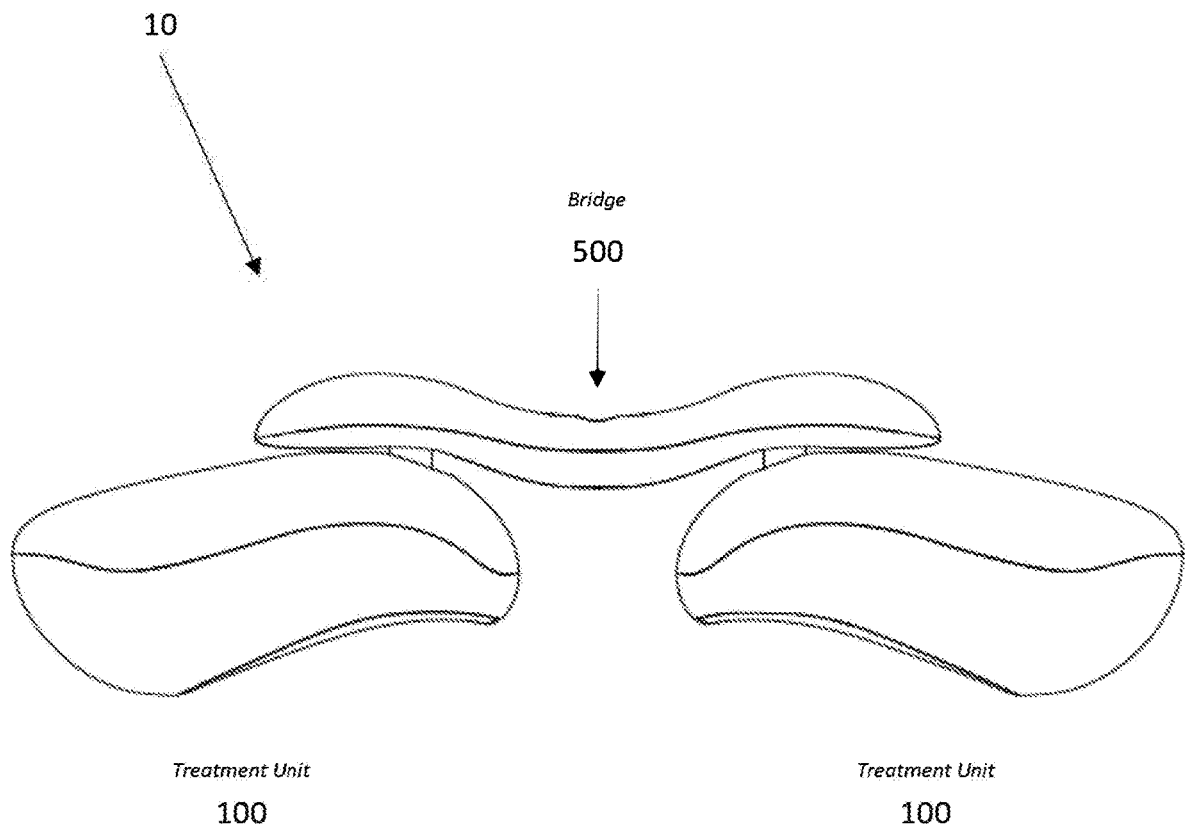
FIG. 2 illustrates a side view of a stress treatment assembly comprising two treatment units and a bridge.

FIG. 2 illustrates a side view of a stress treatment assembly 10 according to an example. In such example, the stress treatment assembly 10 includes two treatment units 100 connected by a bridge 500, so that the stress treatment assembly may apply therapy to both eyes at the same time if desired. In some examples, the user can choose to use either or both of the treatment units at a time. The two treatment units are identical to or as mirror image to each other. In one example, the stress treatment assembly 10 is used while the user is lying face up and the treatment unit 100 rests on the eyelids of the user without using any means to attach the stress treatment assembly 10 to the head of the user. This prevents too much pressure on the eyelids. It may also improve safety because it allows the stress treatment assembly to slide off the user's face when the user falls asleep. In some examples, an optional attachment member is used to secure the stress treatment assembly 10 in place in operation. The attachment member may be a headband, strap or the like made from a flexible material such as neoprene that allows the attachment member to stretch. With the optional attachment member, the stress treatment assembly 10 does not require the user to lie down when using the stress treatment assembly 10. In some examples, there is provided an optional flexible band attached to the ends of the attachment member for attaching the stress treatment assembly 10 around a human head to operate more securely. In some other examples, the flexible band can be configured to allow using one treatment unit 100 at a time while the other treatment unit is not present or present but inactive. The flexible band of the attachment member can be configured to for a user to hold one or more of the treatment units 100 in the user's hand or for the user to attach the treatment unit 100 on another part of the body allowing secured physical contact between the user's body and the treatment unit 100.

An optional moistened pad can be used between user's closed eyelid(s) or other part of the body and the treatment units 100. Any suitable moistened pad known in the field may be used. In some examples, the moistened pad may be made of a fibrous non-woven fabric or other soft cloth material. In some examples, the moistened pad is sized for a typical adult. In some examples, ointment may be provided on the moistened pad. In some examples, one or more pharmacological agents may be provided in or on the pad. In some examples, the moistened pad is removably attached to the lower surface (treatment surface) of the treatment unit 100.

Figure 3:
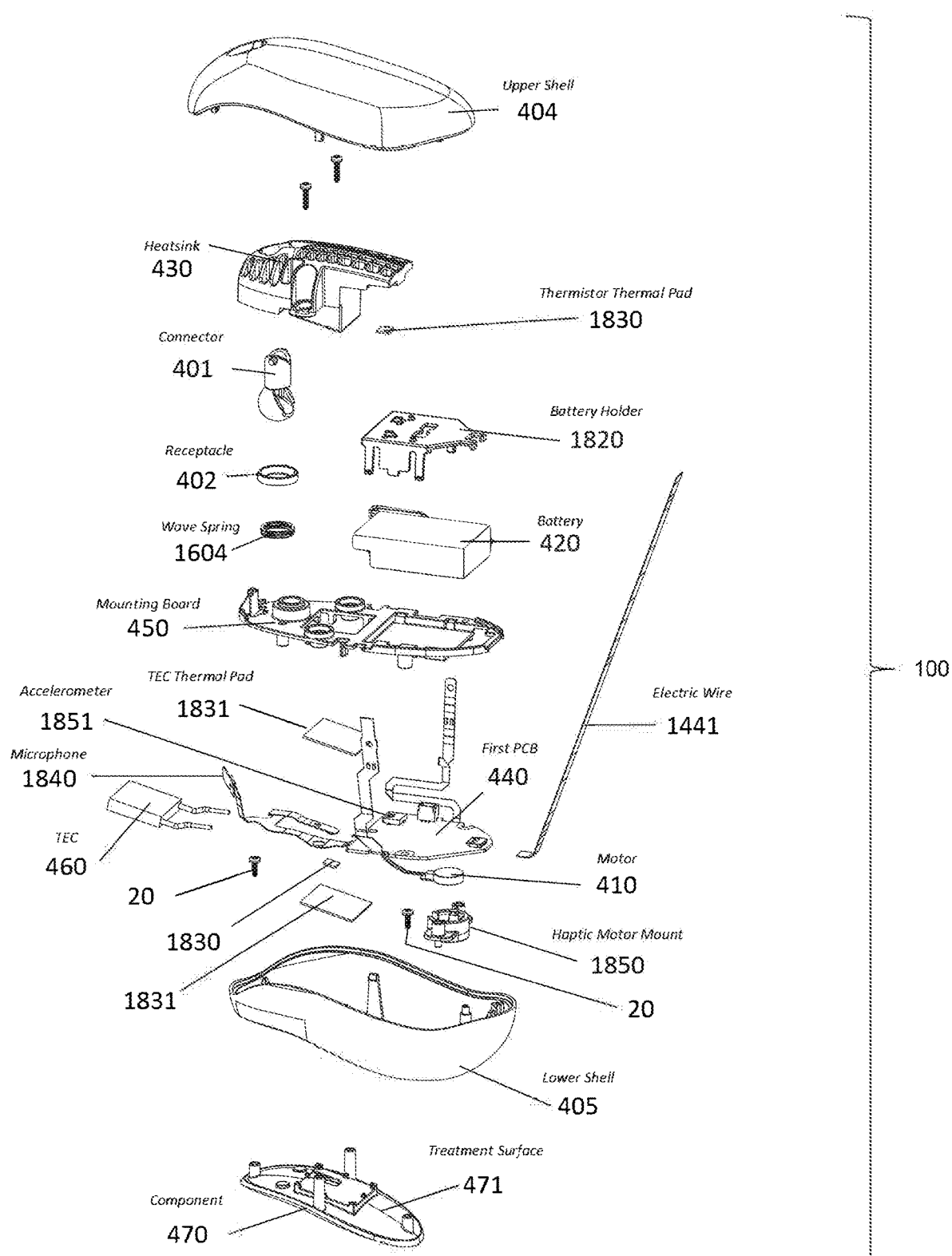
FIG. 3 illustrates an exploded view the treatment unit according to an example of the present application.

FIG. 3 illustrates an exploded view of one example of the treatment unit 100. The treatment unit 100 includes an upper shell 404, a heatsink 430, a lower shell 405 which forms a lower surface (treatment surface) which in use contacts a portion of a user's face or body, a mounting board 450, a vibratory or a haptic motor 410, a battery 420, a component 470, thermoelectric cooler (TEC) 460, a first PCB 440, a first receptacle 402, or friction plate configured to receive at least a wave spring 1604, and a connector 401.

In one example, the treatment unit 100 can also optionally include a thermistor thermal pad 1830, battery holder 1820, one or more TEC thermal pad 1831, one or more accelerometer 1851, one or more microphone, electric wire 1441, haptic motor mount 1850, and one or more screws 20.

In one example, the TEC 460 may be a thermoelectric cooler, a flexible heater, or a radio frequency generator capable of applying heating. In some examples the TEC 460 is able to provide cooling. In other examples the TEC 460 is able to provide heating, and in other examples the TEC 460 is able to provide both heating and cooling.

In certain examples, each of the treatment units can additionally include a vibration unit, one or more LED units, one or more speakers, and other ancillary devices for allowing charging, user control, wireless communication, etc. of each of the treatment units 100 of the stress treatment assembly 500.

In one example, the treatment unit 100 can include a vibration unit having vibration motors for generating vibrational therapy or other haptic stimulation. The vibration motors or one or more haptic motors can be configured to generate a massaging treatment for the user.

In one example, each of the treatment units 100 can include one or more light devices, or light emitting diodes (LED's) for generating light therapy. The light therapy can be a form of visual stimulation where a user's eyes are closed but can notice a change in light intensity near the user's eyes. Depending on the intensity of the light or pattern of the light waves, or both, the user can experience stress relief from the light therapy.

In one example, each of the treatment units 100 can also include one or more speakers for outputting audio signals for generating binaural stimulation for audio therapy. The speakers can be embedded in or on the treatment unit. In one example, a separate set of external headphones configured with one or more microphones, or one or more speakers, or both, can be used as part of the stress treatment assembly 500 for generating audio therapy.

In one example, each of the treatment units 100, under operation, can be synced to provide a patterned stimulation of heat, such as a thermal wave, haptic stimulation and vibration stimulation, light, and sound. In one example, each of the treatment units 100 can individually, or in sync with each other, provide a constant stimulation of energy emitted to the user. In one example, each of the treatment units 100 can sync to each other and perform bilateral stimulation. The bilateral stimulation can include any number of patterned stimulations experienced by the user. For example, the treatment units 100 can generate a repeating cycle of left-to-right stimulations to the user such that the user can experience a pattern of heat or cooling, for example, coming from the left side of the user's eyes continuously and constantly, for example, to the right side of the user's eyes. In this example, the left-to-right pattern can be one unit of a cycle after which the process repeats. An unlimited number of patterns can be configured for generating stress therapy for the user such that the user will experience a cyclical pattern of stimulation from various modalities of therapy discussed above. For example, the pattern can be left-to-right and repeated, the pattern can be right-to-left and repeated, the pattern can be left-to-right and then right-to-left, and repeated, or the patterns can have longer or more complex cycles. In other examples, the patterns can be jagged or pulsed. As an additional example, the left unit can provide constant stimulation to the user for a short period, then stop providing stimulation just as the right unit initiates constant stimulation for a short period. Such pattern of stimulation would then repeat and is an example of bilateral stimulation. The patterns discussed above are merely meant to illustrate specific examples of the patterns that can be used to generate bilateral stimulation and is not meant to be conclusive of its limitation. In one example, the TEC 460, vibration unit, light devices, and speakers, are a treatment component or a treatment device.

In one example, each of the different modalities of generating stress therapy can be configured to apply the therapy under bilateral stimulation. For example, the treatment units can apply heating and cooling under bilateral stimulation. The treatment units can also apply vibrational therapy under bilateral stimulation. The treatment units can also apply light therapy under bilateral stimulation. And the treatment units can also apply audio therapy under bilateral stimulation including binaural therapy. For example, when a sound of a particular frequency provided to the left ear and sound of a second, only slightly different, frequency to the right ear, or vice versa, an audio beat can form which can help the brain relax. For example, the binaural beats created from the speakers can be configured to stimulate different brain waves for different purposes, ranging from sleep, to increasing creativity, relaxation, or concentration and alertness. In one example, each pattern of stimulation does not necessarily have to be applied to each of the different modalities of stimulation at the same time. For example, the treatment units can perform heating and cooling under one pattern while the physically massaging the user under a different pattern of treatment.

Any combination of patterns or bilateral patterns can be applied to any combination of modalities of stimulations for therapy.

In one example, the treatment units 100 can also be configured with one or more sensors for sensing biometric signals of the user. The sensed signals can be configured to build a personal profile of the user using the treatment units 100. In one example, the sensed signals can be detected and transmitted to an application controlling the treatment units in real-time to adapt to the user's stress levels for stress relief. For example, if and when the sensors detect that stress levels are going down, the treatment unit or application controlling the treatment units can adjust the intensity or pattern of the stimulation.

In another example, the sensing signals can be received by the stress treatment assembly and used to generate live information about stress levels, and other biometric signals for the user. The user, using an application and user interface on a mobile device configured to control and monitor the treatment units, can monitor his or her stress levels in real time or receive a report with analytics of each of the biometric signals sensed during the active session. In one example, the user can select different therapy modes directly on a button embedded in the bridge. For example, pressing the button once can activate a first mode, pressing the button again or twice can activate a second mode, and so forth. The modes can be predetermined with default modes, or can be customized through an application and user interface of a mobile device configured to control the treatment units.

In one example, the treatment units 100 can be configured with various combinations of sensors for sensing the biometric signals. For example, the treatment units 100 can include infrared LED's or other light detectors configured to sense and measure heart rate, breathing rate, or other respiratory patters of the user. In another example, the one or more treatment units can be configured with a thermistor configured to measure temperature. In one example, the one or more treatment units can each include accelerometers, gyroscopes, inertial measurement units (IMU's), etc., to measure respiratory waveforms and heart rate of the user by detection motion of the user. In one example, the sensed signals from the accelerometer, gyroscope, IMU's, or a combination thereof can be used to supplement the biometric sensing signals from the LED's. In one example, the one or more treatment units can be configured with one or more microphones configured to receive audio signals for determining respiratory rate. In one example, the one or more treatment units can be configured with an ECG/EKG or electroencephalography (EEG), and electrical brain activity capabilities. In one example, the biometric sensors can also include or be configured to use in conjunction with pulse oximeters and home respiratory programs.

When in operation, the lower shell 405 is positioned close to and faces the user's face or another part of their body while the upper shell 404 faces away from the user's face. The heatsink 430 is close to the upper shell 404. In some examples, the heatsink 430 is disposed next to the upper shell 404 and the upper part of the heatsink 430 is shaped to fit the interior of the upper shell 404. In one example, one or more heatsinks can be configured with patterns made of various grooves, ridges, ribs, or a combination thereof to dissipate heat, such that the heat can be optimally dissipated, dissipated in a controlled matter, dissipated in a pattern, or a combination thereof. For example, depending on the configuration of the grooves, ribs, and ridges, different thermal patterns, such as thermal waves, can be experienced by the user, including bilateral stimulation. In this example, the grooves can be configured to improve heat resistance as to better control the change in heat, ridges and ribs can be configured to improve heat storage. For example, with the inclusion of ridges in the heatsink, the heat generated by TEC 460 will dissipate more slowly near such ridges, resulting in an alternative pattern of heat sensation experienced by the user.

In one example, the patterns created by the grooves, ridges, ribs, or a combination thereof, of each of the heatsinks in the each of the treatment units 100 can be mirror images of each other. In another example, the patterns created in each of the heatsinks of each of the pair of treatment units 100 can be different from that of each other.

In one example, the heatsink is easily accessible by the user and is modular such that different heatsinks of different patterns of grooves, ribs, ridges, and combinations thereof, can be easily swapped out depending on the type of pattern or heat stimulation the user wants to experience.

In one example, one or more energy sources, configured to emit energy directly or indirectly through a heating surface onto the body of a user can be used with the treatment unit 100. The one or more energy sources can be configured inside of each treatment unit in conjunction with TEC 460, vibration units, the one or more speakers, light devices, and sensors. The one or more energy sources can be thermal energy producing sources such as a thermoelectric cooler, a flexible heater, a radio frequency generator capable of applying heating, or a different type of thermal energy source. In another example, the one or more energy sources can produce other types of energy, including but not limited to one or more of vibrational energy, sound energy, electrical energy or light energy, that can be experienced directly by a user.

In one example, a plurality of energy sources can be positioned in various locations along a treatment surface configured to contact a user's body directly such as the eyelid, or skin, or hand. The locations can be placed to form a pattern on the treatment surface as to optimize energy emitted to the treatment surface and then onto the user. The one or more energy sources can also be configured to enhance the thermal wave or thermal waves, control specific areas of the treatment surface, or a combination thereof, such that at a given moment, some portions of the treatment surface are active with thermal energy, some portions of the treatment surface have no energy or are absorbing thermal energy, or a combination thereof. In some examples, different areas or portions of the treatment surface can be heated or cooled at different locations and times. The intensities of each area of the treatment surface can also be dynamic and regulated due to having a plurality of energy sources. For example, the configuration of having a plurality of energy sources located across a treatment surface can be used to allow a dynamic heating and cooling experience. And for example, the treatment unit having multiple energy sources can be configured to treat spots on the skin of a user.

A connection component may be used to connect the TEC 460 to the first PCB 440 by one or more electrical conductors (not shown). In some examples, the battery 420 is connected to the first PCB 440. The first PCB 440 may be used to control the battery 420 and TEC 460 during use. In some examples, the PCB 440 may control charging of the battery 420. The first PCB 440 may be connected to the battery 420 and TEC 460 by any suitable means known in the field, for example, by using electrically conductive traces, wires or the like (not shown). The battery 420 may be rechargeable and/or replaceable. In a preferred example, the battery 420 is rechargeable and fixed. The battery 420 provides power to the TEC 460.

Additional to TEC, in one example, each of the treatment units can additionally include a vibration unit, one or more LED units, one or more speakers, and other ancillary devices for allowing charging, user control, wireless communication, etc. of each of the treatment units 100 of the stress treatment assembly 500.

In one example, the treatment unit 100 can include a vibration unit having vibration motors for generating vibrational therapy or other haptic stimulation. The vibration motors or one or more haptic motors can be configured to generate a massaging treatment for the user.

In one example, each of the treatment units 100 can include one or more light devices, or light emitting diodes (LED's) for generating light therapy. The light therapy can be a form of visual stimulation where a user's eyes are closed but can notice a change in light intensity near the user's eyes. Depending on the intensity of the light or pattern of the light waves, or both, the user can experience stress relief from the light therapy.

In one example, each of the treatment units 100 can also include one or more speakers for outputting audio signals such as binaural stimulation for audio therapy. The speakers can be embedded in or on the treatment unit. In one example, a separate set of external headphones configured with one or more microphones, or one or more speakers, or both, can be used as part of the stress treatment assembly 500 for generating audio therapy.

In some examples, the first PCB 440 may be connected to a motor 410. The motor 410 may be used to provide haptic notifications to the user by way of vibration. The motor 410 may additionally or alternatively be used to apply vibrational "massage" treatment. The motor 410 may be placed anywhere within the treatment unit 100 but may be particularly suited for placement on component 470 or one lower shell 405. In one example, the haptic motors of each of the treatment units 100, under operation, can be synced to provide a patterned stimulation of vibration. For example, each of the treatment units 100 can sync to each other and perform bilateral stimulation. The bilateral stimulation can include any number of patterned stimulations experienced by the user. For example, the treatment units 100 can generate a repeating cycle of left-to-right stimulations to the user such that the user can experience a massage having a wave pattern, for example, coming from the left side of the user's eyes continuously and constantly, for example, to the right side of the user's eyes. In this example, the left-to-right pattern can be one unit of a cycle and the process repeats. An unlimited number of patterns can be configured for generating stress therapy for the user such that the user will experience a cyclical pattern of stimulation from various modalities of therapy discussed above. For example, the pattern can be left-to-right and repeated, the pattern can be right-to-left and repeated, the pattern can be left-to-right and then right-to-left, and repeated, or the patterns can have longer or more complex cycles. In other examples, the patterns can be jagged or pulsed. As an additional example, the left unit can provide constant stimulation to the user for a short period, then stop providing stimulation just as the right unit initiates constant stimulation for a short period. Such pattern of stimulation would then repeat and is an example of bilateral stimulation. The patterns discussed above are merely meant to illustrate specific examples of the patterns that can be used to generate bilateral stimulation and is not meant to be conclusive of its limitation. In one example, the motor 410 is attached to the side of the lower shell 405 that is interior to the treatment unit 100, for example, by an adhesive or the like. The motor 410 may be attached by any other means known in the field. For example, a receptacle structure may be provided within the treatment unit 100 to receive the motor 410.

The mounting board 450 is used to secure the different components within the treatment unit 100, for example, the PCB 440. In some examples, a through-hole is configured in the mounting board 450 so that the upper part of the TEC 460 passes through the through-hole to be in contact with the lower part of the heatsink 430. The heatsink 430 can be used to draw heat away from the TEC 460 during cooling treatment. In one example, the heatsink 430 can be configured with patterns made of various grooves, ridges, ribs, or a combination thereof to dissipate heat, such that the heat can be optimally dissipated, dissipated in a controlled matter, dissipated in a pattern such as a thermal wave, or a combination thereof. For example, depending on the configuration of the grooves, ribs, and ridges of the heatsink 430, different thermal patterns, such as thermal waves, can be experienced by the user, particularly under bilateral stimulation. In some examples, the lower part of the heatsink 430 may be formed to maximize the contact area with the TEC 460. In some examples, the battery 420 is attached to the bottom of the mounting board 450 by any suitable means known in the field. In some examples, the battery 420 is attached to the mounting board by adhesive.

The mounting board 450 is also used to fixedly receive universal joint (for example a ball joint) for adjustably repositioning one treatment unit 100 relative to the bridge 500. The universal joint includes a connector 401 (for example a ball, snap button or mechanical locking mechanism) and a first receptacle (for example a socket, snap button or mechanical locking mechanism) 402. The first receptacle 402 rotatably receives the lower end of the connector 401. In a preferred example, the surface of the first receptacle 402 is partially spherical (concave), while the lower end of the connector 401 is ball-shaped (convex), so that the lower end of the connector 401 forms a ball joint structure with the first receptacle 402. In some examples, the upper part of the connector 401 is a stem that extends through corresponding holes defined in the heatsink 430 and the upper shell 404. In some examples, the connector 401 is hollow to allow the passage of electrical conductors therethrough to connect the first PCB 440 to the bridge 500. In some examples, the universal joint utilizes a mechanical connection (for example a snap-fit) between the connector 401 and receptacle 402, in other examples, the universal joint may utilize magnet coupling in place of the mechanical connection to connect the connector 401 and receptacle 402. For example, either or both of the connector 401 and receptacle 402 may be formed of a magnetic material with a polarity selected such that the two components are mutually attracted to one another. In such example, the magnetic coupling allows for the two treatment units to be removed from the bridge and used independently. In this example, each of the two treatment units 100 can be used simultaneously for a user's eyes. In another example, one of the two treatment units can be active while the other treatment unit is inactive. The magnetic coupling can allow for an easy detachment of each of the treatment units 100 from the bridge 500. The active treatment unit can be used to provide therapy for one eye. In one example, one or more treatment units of the two treatment units can be used for a hand of the user or another part of the user's body such that the user can hold the treatment unit as a pod. In one example, the two treatment units can be detached from the bridge such a first one treatment unit can be used for one eye of the user while a second treatment unit can be inactive or can be used on the user's hand concurrently with the first treatment unit.

While a user is using the treatment unit on at least one of his or her hands as a pod, the treatment unit can also generate bilateral stimulation on the hands by thermal waves, thermal stimulation, vibration and haptics, or a combination thereof. For example, if the user is holding each of two treatment units in her two hands, respectively, and selects a therapy delivery session that includes bilateral stimulation, the user can feel a thermal wave, a vibration patter, or both from one hand to the other hand and back. The patterns can be customized and do not necessarily have to be applied to each of the different modalities of stimulation at the same time. For example, the treatment units can perform heating and cooling under one pattern of bilateral stimulation while physically massaging the user under a different pattern of bilateral stimulation.

In some examples, the component 470 has a treatment surface 471 that is in contact with the eyelid when the treatment unit 100 is in operation. In some examples, the treatment surface 471 is generally concave, i.e., has a shape complementary of a human eye and/or sized for a typical adult. In a typical example, the treatment surface 471 is smooth. The treatment surface 471 may be made of metal, plastic, rubber, textile or any other suitable material. Preferably, the treatment surface 471 is made of a temperature conductive material, such as a metal selected from the group steel, stainless steel, copper, silver, gold and aluminum. In some examples, the lower shell 405 has a hole defined therethrough configured to expose the surface 471 to the exterior of the lower shell 405 when the thermal treatment 100 is assembled, such that the surface 471 is in contact with the eyelid when the treatment unit 100 is in operation.

In some other examples, the lower shell 405 is configured with the concave portion sized for a typical adult on the lower exterior surface of the lower shell 405. The concave portion is in contact with the closed eyelids when the treatment unit 100 is in operation to provide one or more of heating, cooling, vibration, or light treatment to the eyes. In such examples, the surface of the lower shell 405 that is interior of the lower exterior surface is in contact with the lower surface of component 470 to receive heating or cooling from the TEC 460.

In some examples, the component 470 may include a mounting structure configured to receive the TEC 460 therein so that the TEC 460 is close to the treatment surface 471 and to ensure that the TEC 460 will not move inside the treatment unit 100. In some examples, the mounting structure is a groove to receive the lower part of the TEC 460 therein. In one example, the vibration unit and light unit for generating vibrational stimulation and light stimulation patterns can be similarly received by the mounting structure that is configured to receive TEC 460. In some examples, when the treatment unit 100 is assembled, the component 470 is fixedly attached to the mounting board 450 by any suitable means known in the field including adhesive and/or screws.

In operation, the treatment units 100 are placed over a closed outer eyelid to provide therapy. The treatment units 100 may be made of a material that is safe for placement against the skin. The treatment unit 100 may optionally include one or more temperature sensors such as thermistors and/or thermocouples to ensure precise temperature control. The temperature sensor(s) can provide temperature readings to a processor, or controller, or both. In some examples, a processor 502, controller 502, or both, are located in the bridge 500 but in other examples, the processor, or controller, or both can be located on the PCB 440. For example, a first temperature sensor 1732 (FIG. 11) may be provided to measure the temperature of the treatment surface 471. A second temperature sensor may be provided to measure the temperature of the TEC 460. A third temperature sensor, or thermistor thermal pad, may be provided to measure the temperature of the heatsink. If any one of the temperature readings from the one or more temperature sensors exceeds a predefined threshold, the processor on the PCB 440 may discontinue operation of the treatment unit 100 to prevent injury.

In some examples, the first PCB 440 may identify a minimum and maximum temperature that may be generated by the treatment unit 100 to ensure that the thermal elements are within a safe temperature range for use against unprotected skin. In some examples, the treatment unit 100 transfers thermal energy (e.g., heating and/or cooling) supplied from a thermoelectric chip, such as the TEC 460 and directs the thermal energy via component 470 towards the user's eyes and eyelids. The TEC 460 generates thermal energy within the treatment unit 100.

Figure 4:
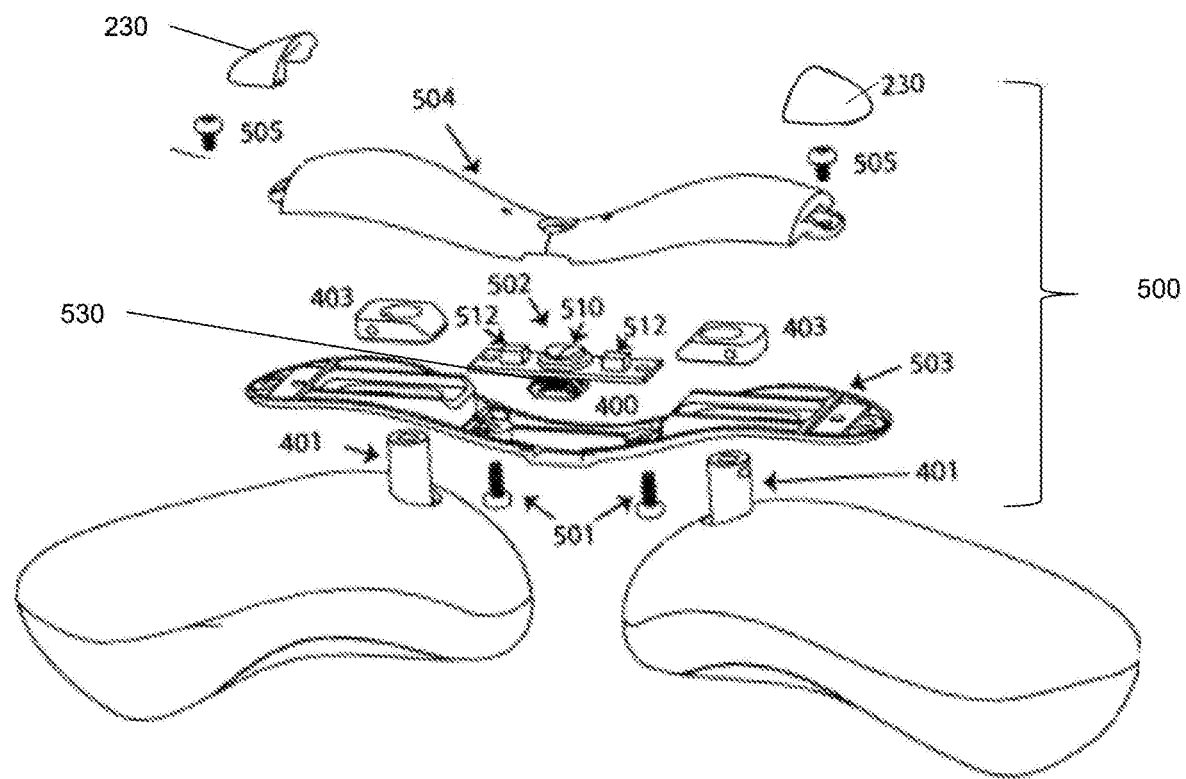
FIG. 4 illustrates a side exploded view of a bridge.

FIG. 4 illustrates a side exploded view of bridge 500. The bridge 500 connects the two treatment units 100. The bridge 500 comprises an upper shell 504 and a lower shell 503. The upper shell 504 and the lower shell 503 can be connected by any suitable means known in the field. FIG. 4 shows that they may be connected by screws 505 and the screws 505 are then covered with screw covers 230. The two treatment units 100 may be electrically connected to the bridge 500 so that the bridge 500 can be powered by at least one battery 420 in one of the treatment units 100. The electrical connection between the treatment units 100 and the bridge 500 may use electrical conductors or wires passing through the hollow connectors 401 as described earlier. In one example, the upper shell 504 and lower shell 503 can be connect by screws 501.

As will be explained in further detail below, in some examples, it may be desirable to synchronize the treatment units 100 such that they provide synchronous treatment. In any of the example treatment units disclosed herein, a timing signal may be communicated over the aforementioned electrical connection between the treatment units 100. Alternatively, the timing signal may be supplied wirelessly, in which case the treatment unit may be equipped with wireless communications hardware including near field communications, Bluetooth® transmitter/receiver or the like in communication with the processor. In some examples, the wireless communications hardware may be used to communicate with a smart phone or the like which may be used to control the therapy supplied by the treatment unit 100 and/or store data transmitted from the treatment unit 100.

There are several through-holes defined in the lower shell 503 which enable the upper part of the connector 401 to extend there through. The upper end of connector 401 is then received within the second receptacle 403 so that the treatment unit 100 is connected to the bridge 500. The two treatment units 100 are fixedly or removably attached to the bridge 500. For example, one or more magnetic coupling units can be configured to allow for the two treatment units to be removed from the bridge and used independently. The removal of each of the treatment units from the bridge can be done safely and reattached securely from the magnetic coupling units. In one example, each of the treatment units can be wirelessly synced to each other and a mobile device or computer such that operation without the bridge 500 can be achieved. In some examples, one or more of the through-holes in the lower shell 503 feature a groove to allow movement of the upper part of the connector 401 in relation to the bridge 500, for example, to fit different sizes of faces of the users.

In some examples, the bridge 500 includes a power input port 530 for receiving an electrical cord to connect the bridge 500 with an electrical power supply, thus providing power for charging the batteries 420 of the treatment units 100 and/or for operation of the bridge 500. When an electrical cord is not connected to the power input port 530 of the bridge 500, at least one of the batteries 420 of the two treatment units 100 that are attached to the bridge 500 may provide power for the operation of the bridge 500. In some examples, the power input port 530 is a micro USB port.

The bridge may further comprise a controller 502 so that the power input port 530 can be fixed to the controller 502. Controller 502 comprises a processor, a memory for storing programs for instructing the processor, and input and output. The bridge 500 may further include an actuator (on/off switch or the like) 510, which may also be fixed to the controller 502. The bridge 500 may further comprise at least one indicator light 512, which may also be fixed to the controller 502. In some examples, the actuator 510 and the light 512 are integrated. In some other examples, the actuator 510 and the light 512 are separate.

In one example when the upper shell 504 and lower shell 503 are assembled, the controller 502 is fixedly sandwiched between the upper shell 504 and the lower shell 503. The upper shell 504 and lower shell 503 are so configured that when they are assembled the power input port 530 is exposed for receiving a power input cord. In another example, the device may be charged wirelessly for example through inductive charging. The upper shell 504 may have one or more holes configured therein for exposing the switch 510 and the indicator light 512. In one example, one or more magnetic coupling units can be configured to allow for the two treatment units to be removed from the bridge and used independently. The removal of each of the treatment units from the bridge can be done safely and reattached securely from the magnetic coupling units. In one example, each of the treatment units can be wirelessly synced to each other and a mobile device or computer such that operation without the bridge 500 can be achieved.

In some examples, the actuator 510 and indicator light 512 are electrically connected to the first PCB 440. Control signals and power can be sent to the first PCB 440 and battery 420, while power can be sent from either or both batteries 420 from the two treatment units 100 to the actuator 510 and the light 512. The electrical connection can be by any suitable means in the field, for example, by electrical traces, conductors, wires, or the like (not shown). In some examples, actuator 510 is an interface which allows a user to control treatment cycles of the treatment units 100. For example, there may be a single 15-minute heat therapy treatment or a 5-minute cold therapy, or similar visual sequence, audio sequence, vibrations or massage treatment, or a combination thereof. Additionally, or alternatively, an external device such as a smartphone may be used to select the treatment or therapy supplied by the unit 100.

In a preferred example, the controller 502 is a second PCB. In some examples, the actuator 510 and the light 512 may be fixed to the second PCB 502. In such examples, the second PCB 502 may be electrically connected to the first PCB 440, for example, by electrical traces, conductors, wires, or the like (not shown) through the connector 401. The power input port 530 may be fixed to the second PCB 502. In such examples, the power from the power input port 530 is sent through the second PCB 502 to the first PCB 440 for charging the battery 420 and a control signal is also sent from the second PCB 502 to the first PCB 440. When no external power is provided at the power input port 530, the second PCB 502 may receive power from at least one of the batteries 420 from the two treatment units 100.

The actuator 510 may be a switch or selector and can be used for selectively activating the heating or cooling of the treatment units, for controlling charging the battery within the treatment units, and for deactivating the heating or cooling of the treatment units. In another example, the activating the heating, cooling, vibrations, light therapy, audio, or any combination thereof can be controlled wirelessly through a Wi-Fi or Bluetooth connection by an application and user interface of a mobile device or computer. For example, depression of a push button may activate the actuator 510 send signal to the first PCB 440 of at least one of treatment units 100 to activate the preheating, or precooling sequence, massage or bilateral stimulation of vibrations, light stimulation, and audio stimulation, or programs of the treatment units 100. The activation of the sequence may be indicated with a single pulse vibration generated by the motor 410 in the treatment unit 100. This may be followed by a dual or two-pulse vibration that indicates that therapeutic temperature, haptic and vibration therapy, visual therapy, and audio therapy, of the treatment unit 100 has been reached and a three-pulse motor vibration when the heat, cooling, visual sequence, audio sequence, vibrations or massage, or a combination thereof has completed. In such example, the push button can be depressed again at any time to stop the treatment, which immediately stops the heating, cooling, massage, vibrations, light, audio signals, or combination of the above. As well, the indicator light 512 may be used for indicating activation of the thermal treatment, haptic treatment, visual and audio treatment, as well as the status of the thermal treatment, haptic treatment, visual and audio treatment, and charging of the treatment units by the lights 512 changing color and/or flashing in different patterns. In some examples, the second PCB 502 is configured to store pre-determined heating and cooling sequences, as well as visual, audio, and massage and vibration sequences that the user can choose from by pressing the button 510. In examples in which the button 510 is fixed to the second PCB 502, the operation of the button 510 and light 512 described above may be realized through the second PCB 502 by the second PCB 502 providing suitable control mechanisms. In another example, the button 510 can be configured to control the functions of each of the treatment units 100 even when the treatment units 100 are detached from the bridge. In another example, each of the treatment units has its own button that enables the user to activate various treatments without the need for any other devices. The indicator light 512 can be configured to indicate that one, or both, of the treatment units are detached from the bridge and whether each of the treatment units are in use.

FIGS. 5 to 10 show another example of the stress treatment assembly 10 and treatment units 100 according to the present disclosure. The stress treatment assembly 10 includes two treatment units 100 connected by a bridge 500. Each treatment unit 100 may include an upper shell 404, heatsink 430, lower shell 405, mounting board 450, battery 420, component 470, thermoelectric cooler (TEC) 460, and first PCB 440. Connection component 490 may be used to connect TEC 460 to first PCB 440 by an electrical conductor, or electrical wire 1441.

Each treatment unit 100 may further comprise a universal joint including a first receptacle 402, a connector 401, including a ball joint connection, and a second receptacle. Connector 401 includes a first and second opposed ends and defines a channel dimensioned to allow passage of electrical conductor, or electrical wire 1441 therethrough. The universal joint allows the orientation of each treatment unit 100 to be repositioned relative to the bridge 500.

First receptacle 1402 is configured to receive first end of connector 401 and comprises a ball joint retainer, a ball joint friction plate and a wave disk spring. Wave disk spring may be received in a channel formed in ball joint retainer. Ball joint friction plate and wave disk spring cooperate to provide for increased resistance of the first end of connector 401 when it is inserted into first receptacle 1402.

Second receptacle is configured to receive second end of connector 401. Second receptacle may be rectangular shaped with chamfered edges or may be shaped liked a trapezoid with beveled edges. An elastomeric device such as a spring 1606 may be provided to increase resistance of the second end of the connector 401 when it is inserted into second receptacle.

In one example, one or more magnetic coupling units can be configured to allow for the two treatment units to be removed from the bridge and used independently. The removal of each of the treatment units from the bridge can be done safely and reattached securely from the magnetic coupling units. In one example, each of the treatment units can be wirelessly synced to each other and a mobile device or computer such that operation without the bridge 500 can be achieved.

Each treatment unit 100 may further comprise one or more additional temperature sensor components, e.g. thermistor/thermocouple, for appropriate temperature control. The heatsink 430 may be equipped with a first temperature sensor, the component may be provided with a second temperature sensor, and the battery 420 may be equipped with a third temperature sensor. The respective one or more temperature sensors transmit temperature information to a processor which will temporarily de-activate, or power-down the treatment unit 100 if the temperature information exceeds a predetermined threshold value.

Figure 8:
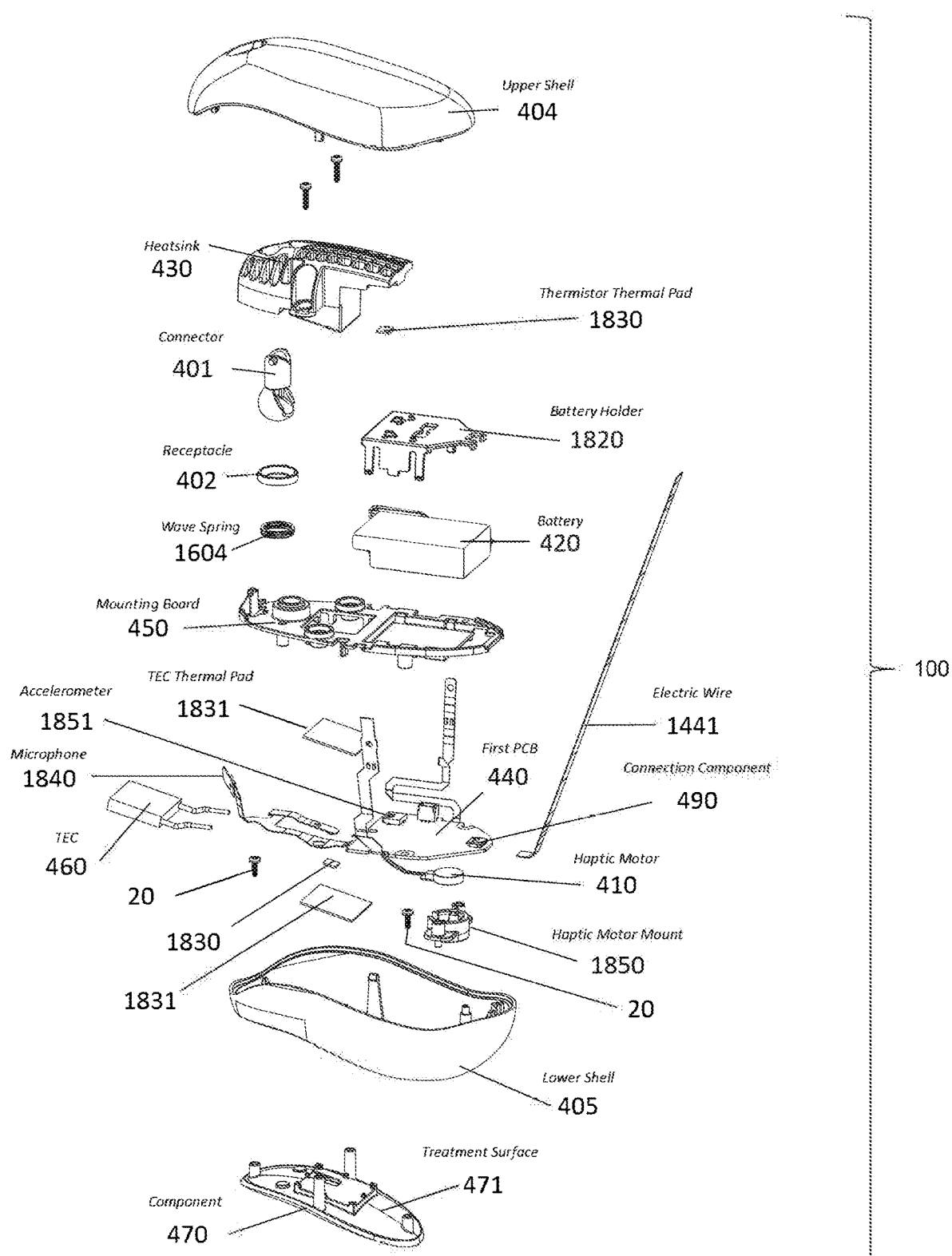
FIG. 8 is an exploded view the treatment unit of FIG. 7.

In one example, as illustrated in FIG. 8, a battery holder 1820, one or more screws 20 for the treatment unit, thermistor thermal pad 1830, a TEC thermal pad 1831, and a haptic motor mount 1850 can be configured in the treatment unit 100.

Figure 9:
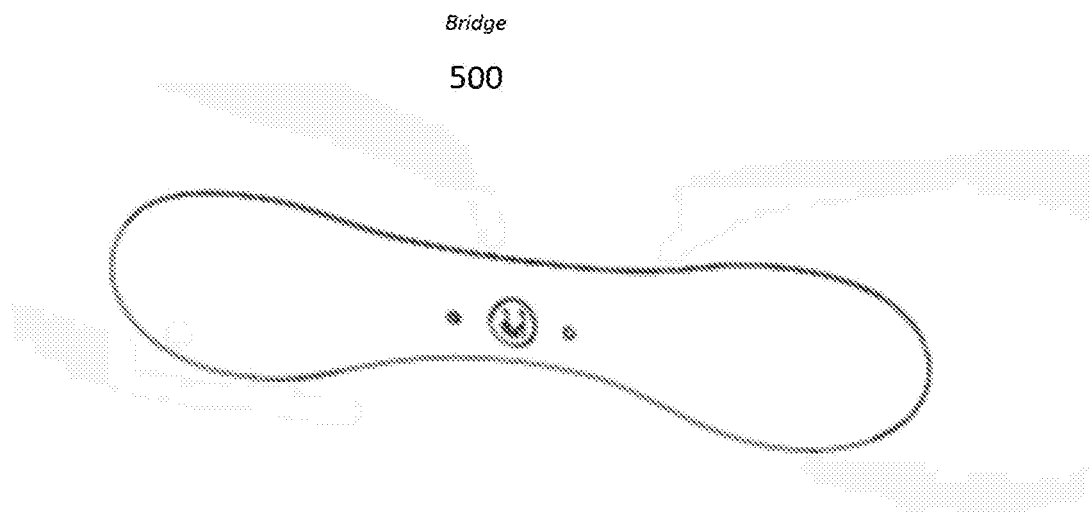
FIG. 9 is a perspective view of the bridge according to an example.
Figure 10:
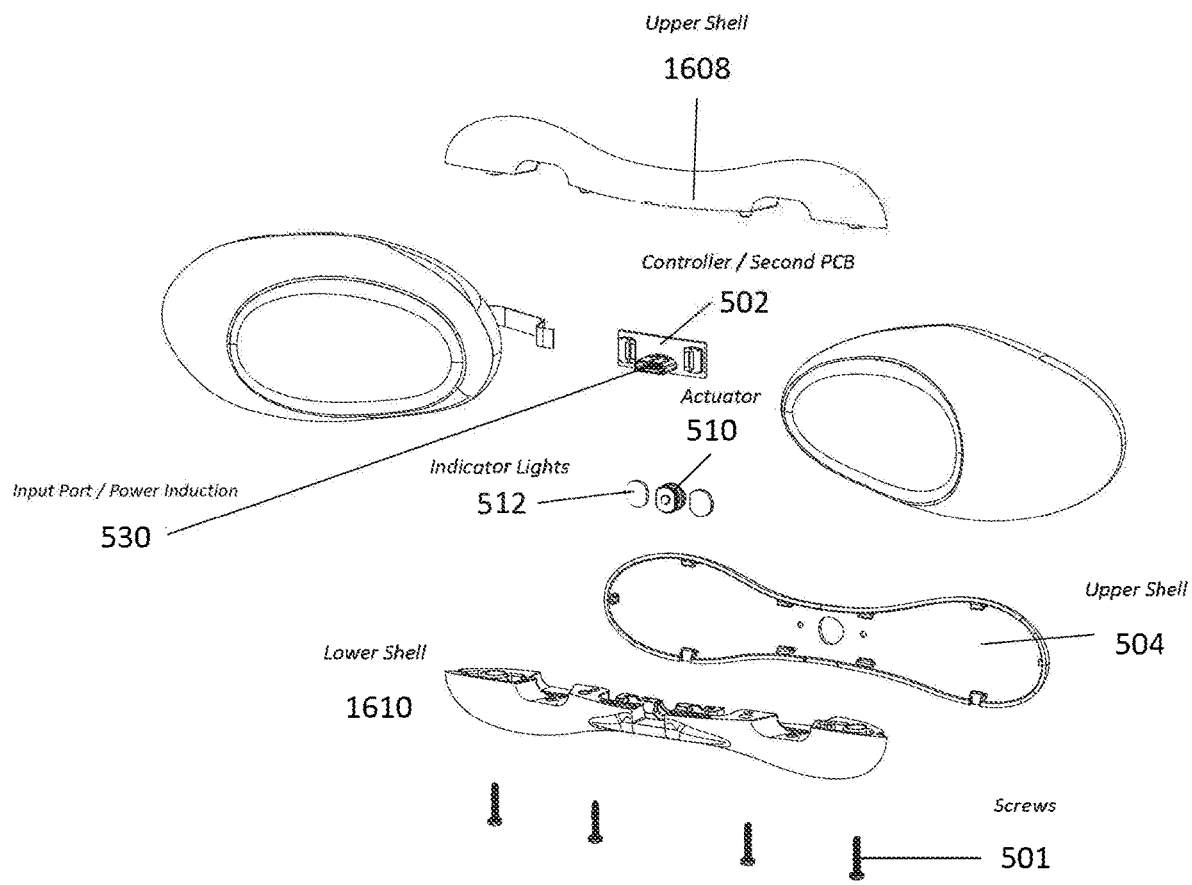
FIG. 10 is an exploded view of the bridge of FIG. 9 with two treatment units.

As shown in FIGS. 9 and 10, a bridge 500 connects the two treatment units 100. Bridge 500 comprises an upper shell 1608, a lower shell 1610, and PCB 502 enclosed by upper shell 1608 and lower shell 1610.

Lower shell 1610 may be configured provide a support structure for PCB 502. Formed in lower shell 1503 are grooves dimensioned to receive second receptacle 403 so as to permit sliding movement of second receptacle 403 therein. Formed in at least one of upper shell 1608 or lower shell 1610 is a power input port 530 for receiving an electrical cord to connect PCB 502 of bridge 500 with a source of electrical power for charging battery or batteries 420.

Bridge 500 may further comprise a nose piece configured for placement onto the user's nose when stress treatment assembly 10 is in use. The nose piece may be removably secured to lower shell 1610. For additional comfort, the positioning of the nosepiece may be adjusted to accommodate different shaped and sized noses as necessary.

In some examples the treatment unit 100 may have a preheating (or precooling) sequence which may signal the user (visually, audially, or vibrationally) when the two treatment units 100 have reached the desired temperature. The treatment unit 100 can also include an actuator 510, and indicator lights 512.

Figure 11:
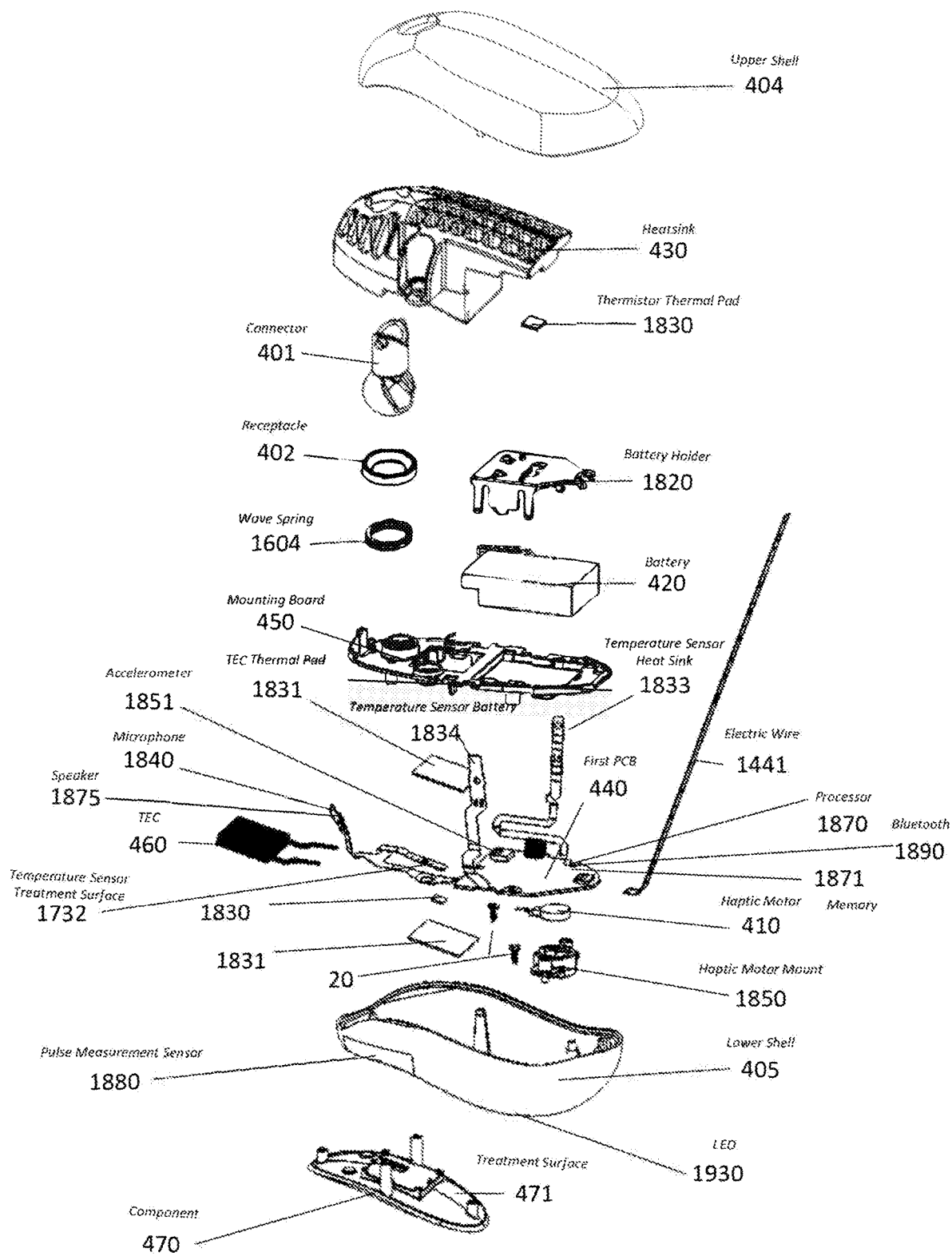
FIG. 11 is an exploded view of an example treatment unit with sensors.

FIG. 11 is an exploded view of another example treatment unit 100. Treatment unit 100 may include one or more optional sensors selected from the group accelerometer and/or gyroscope 1851, microphone 1840, pulse measurement sensor (heart rate monitoring device such as a pulse oximeter, ECG/EKG, or other device) 1880, temperature sensors, EEG, electrodermal activity sensor, and an optical therapy LED.

If one or more optional sensors are provided, they communicate with processor 1870 which may be provided, for example, on either the first PCB 440 or the mounting board 450. The processor 1870 includes or is operably connected to a memory 1871 which may be used to retrievably store readings from the various sensors. The memory 1871 may further be used to store a treatment plan controlling the therapy.

The temperature sensor(s) provide their readings to the processor 1870. For example, a first temperature sensor 1732 may be provided to measure the temperature of the treatment surface 471 to prevent injury to the patient. A second temperature sensor, such as TEC thermal pad 1831, may be provided to measure the temperature of the TEC 460. A third temperature sensor 1833 may be provided to measure the temperature of the heatsink. If any one of the temperature readings from the one or more temperature sensors exceeds a predefined threshold, the processor on the PCB 440 may discontinue operation of the treatment unit 100 to prevent injury. A temperature sensor 1834 for the battery 420, a temperature sensor, such as a thermistor thermal pad 1830, can also be included in treatment unit 100.

The treatment unit may be equipped with wireless communications hardware 1890 including near field communications, Bluetooth® transmitter/receiver or the like in communication with the processor 1870. In some examples, the wireless communications hardware may be used to communicate with a smart phone or the like which may be used to control the therapy supplied by the treatment unit 100 and/or store data transmitted from the treatment unit 100.

The optional microphone 1840 may be used, for example, to monitor the patient's respiration. The processor 1870 may monitor respiration throughout a treatment cycle and adjust the treatment in response to the detected respiration.

The optional pulse measurement sensor may be used, for example, to monitor the patient's pulse and/or heart rate variability. The processor 1870 may monitor the patient's pulse throughout a treatment cycle and adjust the treatment/treatment in response to the detected pulse. The pulse measurement sensor 1880 may be but is not limited to an infrared optical pulse measurement device. Any known sensor for measuring a patient's pulse may be utilized. The optional accelerometer and/or gyroscope 1851 may be used to determine the patient's pulse and/or heart rate variability using ballistocardiography. The optional accelerometer and/or gyroscope 1851 may be used to coordinate readings by the pulse measurement sensor 1880. Namely, if the accelerometer and/or gyroscope 1851 detects that the device 100 is in motion it may suspend readings of the pulse measurement sensor 1880. The optional accelerometer 1851 and pulse measurement sensor 1880 may be provided on the component 470 or on the shell 405 such that the sensor is on or near the treatment surface 471.

In one example, as illustrated in FIG. 11, a battery holder 1820, one or more screws 20 for the treatment unit, one or more temperature sensors (1732, 1833, 1834), a thermistor thermal pad 1830, a TEC thermal pad 1831, and a haptic motor mount 1850 can be configured in the treatment unit 100. Additionally, a temperature sensor treatment surface 1732, a temperature sensor heatsink 1833, and a temperature sensor battery 1834 can be configured in the treatment unit 100.

In another example, treatment units can be used in conjunction with external and ancillary devices, for example external accelerometers placed near a bed, when the user is lying down and using the treatment units on top of his or her body such as the eyes. In this configuration, because the body of the user is located between the treatment unit and the external accelerator, as the user's heart pumps and also inhale and exhale breaths, a signal from the accelerometer will recoil and can be sensed by the sensing devices in the treatment units. In another example, when the user is undergoing therapy on the user's hands, an accelerometer can be held by another part of the user's hand or attached to the back side of the user's waist to allow the treatment unit to sense the signals similar to that of the signals sensed from the accelerometer under the bed when the user is laying down.

In one example, the treatment units can be synced to perform functions in conjunction with other ancillary devices such as a smartwatch or fitness tracker having heart rate monitors respiratory monitors and can receive or send information to the smartwatch or fitness tracker.

The treatment unit 100 is capable of providing various treatments and treatment cycles. In some examples, the treatment unit 100 is capable of providing temperature therapy such as soothing heating and or cooling therapy to the patient using the TEC 460. The temperature therapy is conducted via the treatment surface 471. The TEC 460 under the control of processor 1870 can provide any number of temperature therapy cycles. A user can specify and initiate a treatment directly on the treatment unit using actuator 510, or may instead use a software interface on a smartphone or the like which in turn communicates with the treatment unit 100 wirelessly. The TEC 460 may gradually ramp the temperature warmer until it reaches a specified or predetermined temperature value, hold or maintain the temperature at a specified value, gradually ramp the temperature cooler until it reaches a specified or predetermined temperature value, or any combination of heating and cooling desired. The user can specify the rate of temperature change up until a maximum safe value, a target heating and/or cooling temperature value(s), and one or more dwell times for maintaining a given temperature value. As discussed earlier, each of the two TEC's 460 can be synced to provide a patterned stimulation of heat, such as a thermal wave. In one example, each of the treatment units 100 can sync to each other and perform bilateral stimulation. In this example, the thermal waves can be generated directly by each of the TEC 460 by increasing and decreasing the temperature in a predetermined cycle. The propagation of the thermal waves can then be further affected by the pattern of the heatsink through its grooves, ribs, and ridges. The stimulation can include any number of patterned stimulations experienced by the user including bilateral stimulation. In one example, the TEC can generate throttling mode such that a pulsed wave can be achieved and experienced by the user.

In some examples, the treatment unit 100 is capable of providing vibrational "massage" therapy to the patient using the motor 410. The motor 410, under the control of processor 1870, can provide any number of vibratory "massage" therapy cycles. A user can specify and initiate a treatment directly on the treatment unit 100 using actuator 510, or may instead use a software interface on a smartphone or the like which in turn communicates with the treatment unit 100 wirelessly. The motor 410 may gradually ramp up or down the intensity of the vibrations, hold/maintain the intensity of the vibrations at a specified value, or any combination of intensity and/or dwell time desired of a duty cycle.

For example, the device can generate a repeating cycle of left-to-right stimulations to the user such that the user can experience a pattern of heat or cooling, for example, coming from the left side of the user's eyes continuously and constantly, for example, to the right side of the user's eyes. In this example, the left-to-right pattern can be one unit of a cycle and the process repeats. An unlimited number of patterns can be configured for generating stress therapy for the user such that the user will experience a cyclical pattern of stimulation from various modalities of therapy discussed above. For example, the pattern can be left-to-right and repeated, the pattern can be right-to-left and repeated, the pattern can be left-to-right and then right-to-left, and repeated, or the patterns can have longer or more complex cycles. In other examples, the patterns can be jagged or pulsed. As an additional example, the left unit can provide constant stimulation to the user for a short period, then stop providing stimulation just as the right unit initiates constant stimulation for a short period. Such pattern of stimulation would then repeat and is an example of bilateral stimulation. The patterns discussed above are merely meant to illustrate specific examples of the patterns that can be used to generate stimulation, including bilateral stimulation, and is not meant to be conclusive of its limitation.

In one example, each of the different modalities of generating stress therapy can be configured to apply the therapy under bilateral stimulation. For example, the treatment units can apply heating and cooling under bilateral stimulation. The treatment units can also apply vibrational therapy under bilateral stimulation. The treatment units can also apply light therapy under bilateral stimulation. And the treatment units can also apply audio therapy under bilateral stimulation including binaural therapy. For example, when a sound of a particular frequency provided to the left ear and sound of a second, only slightly different, frequency to the right ear, or vice versa, an audio beat can form which can help the brain relax. In one example, each pattern of stimulation does not necessarily have to be applied to each of the different modalities of stimulation at the same time. For example, the treatment units can perform heating and cooling under one pattern while the physically massaging the user under a different pattern of stimulation.

In some examples, the treatment unit 100 is capable of coordinating vibrational and temperature therapy supplied to the patient. A user can specify and initiate a predefined treatment cycle (stored in memory 1871) directly on the treatment unit 100 using actuator 510, or may instead use a software interface on a smartphone or the like which in turn communicates with the treatment unit 100 wirelessly.

In some examples, the treatment unit 100 uses a feedback loop to alter the treatment supplied to the user. The treatment unit 100 may, for example, monitor the heart rate of the user using the pulse measurement sensor (heart rate monitoring device) 1880 at various times during the therapy cycle, and the processor 1870 may adjust the therapy to determine optimal settings. Alternatively, or in combination with such feedback loop, the treatment unit 100 may, for example, monitor the respiration rate of the user using the microphone 1840 at various times during the therapy cycle, and the processor 1870 may adjust the therapy to determine optimal settings. For example, the feedback loop can be generated based on biometric sensing signals of the user detected by using ECG/EKG and EEG. The feedback can then be used to adjust the treatment settings, profile, or both and can either alter a currently active treatment session, be saved for use as suggestions for altering the next treatment session, or both.

In some examples, the processor 1870 may coordinate therapy supplied by the treatment unit 100 with music, "white noise", binaural beats or other audible information which may be played through a built-in speaker within the treatment unit 100 or through an external device such a smartphone, smart-speaker, headphones or the like. The user may select a given audio treatment using the actuator 510 or using software interface on a smartphone or the like. The processor 1870 coordinates the timing of the various treatments to make sure that everything is in sync.

In some examples, the processor 1870 can coordinate visual therapy using one or more light devices, or light emitting diodes (LED's) for generating light therapy. The visual therapy can be a form of visual stimulation where a user's eyes are closed but can notice a change in light intensity near the user's eyes. Depending on the intensity of the light or pattern of the light waves, or both, the user can experience stress relief from the light therapy.

Figure 5:
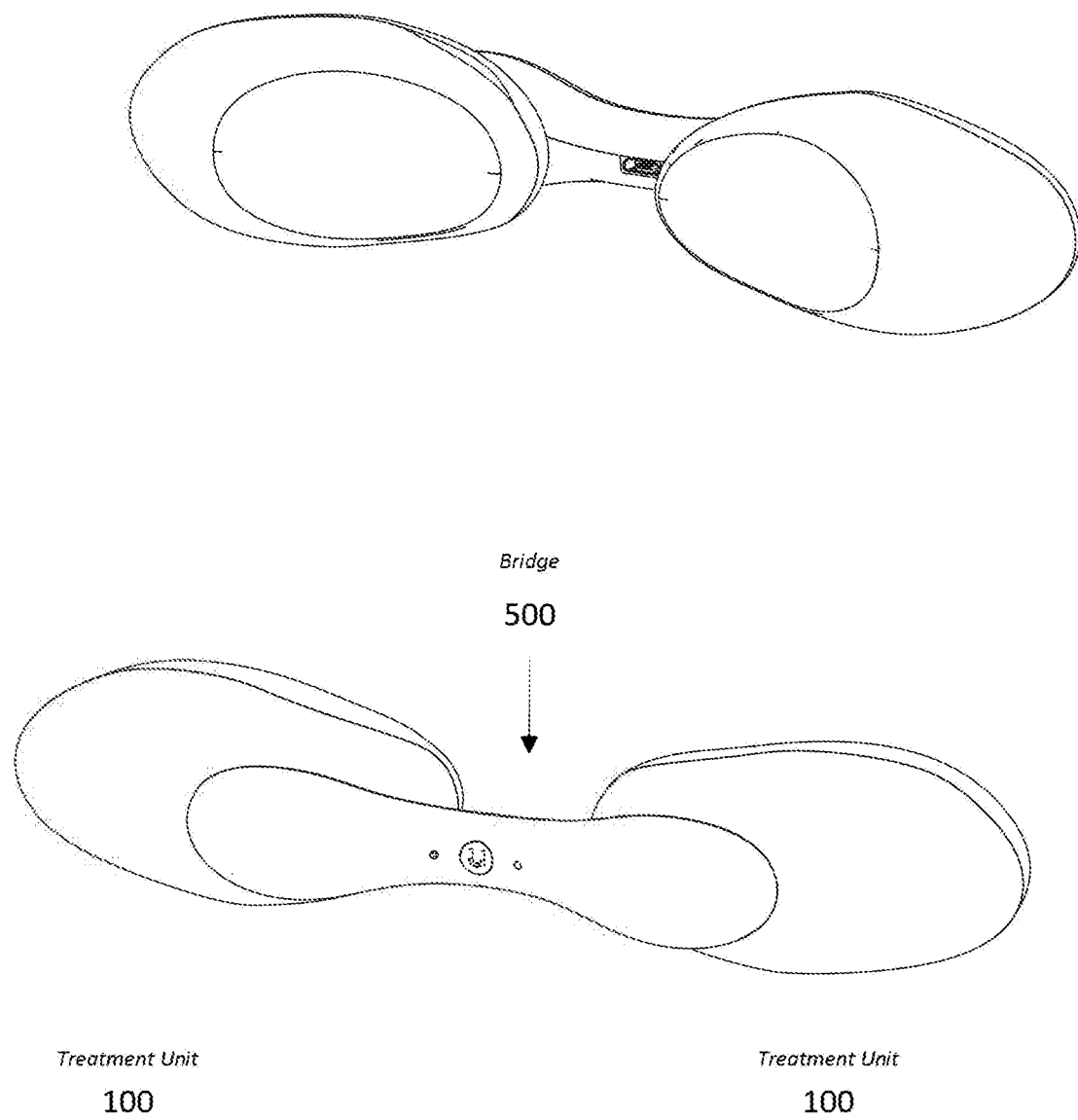
FIG. 5 is a perspective view of a stress treatment assembly according to another example showing two treatment units connected by a bridge.
Figure 6:
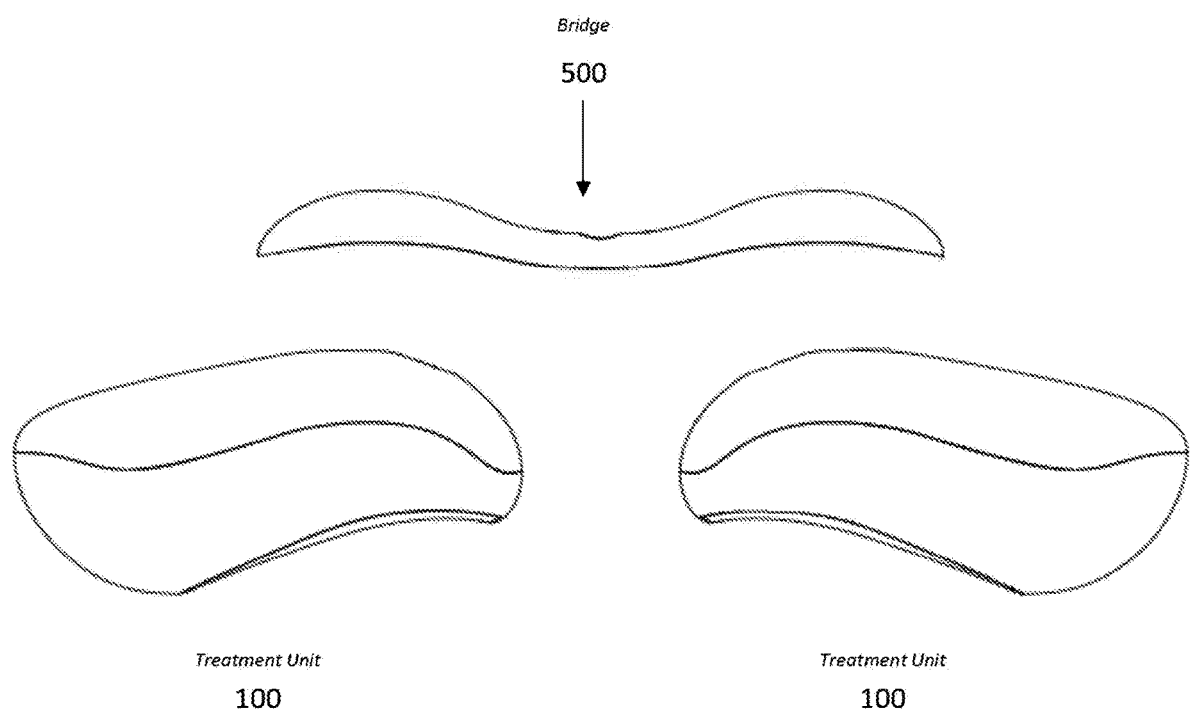
FIG. 6 is a side elevation view of the stress treatment assembly of FIG. 5 showing the two treatment units detached from the bridge.
Figure 7:
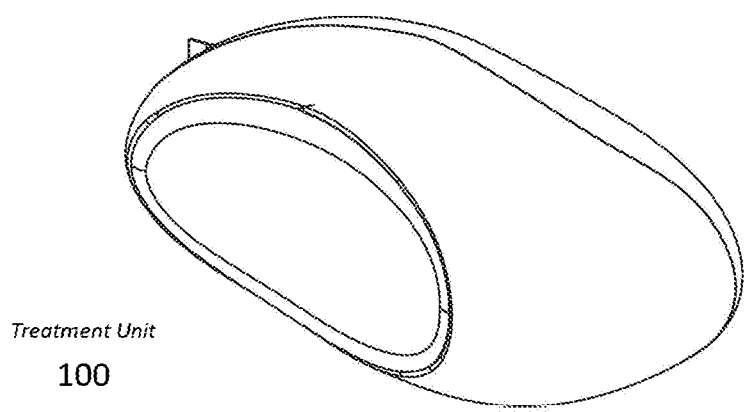
FIG. 7 is a perspective view of the treatment unit in isolation according to an example.

As shown in FIGS. 2 and 5, two treatment units 100 may connected/mounted to a bridge 500. However, each treatment unit 100 is capable of standalone therapy. For example, one treatment unit 100 may be provided on a user's hand, wrist, eye or any other part of the anatomy to provide standalone therapy. In such example when each treatment unit is used individually, it can be activated by a button included on each device in some examples or in other examples can be activated wirelessly using the bridge or a separate device such as a smartphone. In one example, bilateral therapy can also be applied when each of the treatment units are detached and used on the user's hands or body. For example, an attachment member can be configured to allow the user to wear each of the devices, such as treatment units 100, on his or her hand as a ring or wristband. The heating, cooling, and vibrational stimulations can also be generated using bilateral stimulation on the hands.

Figure 12A:
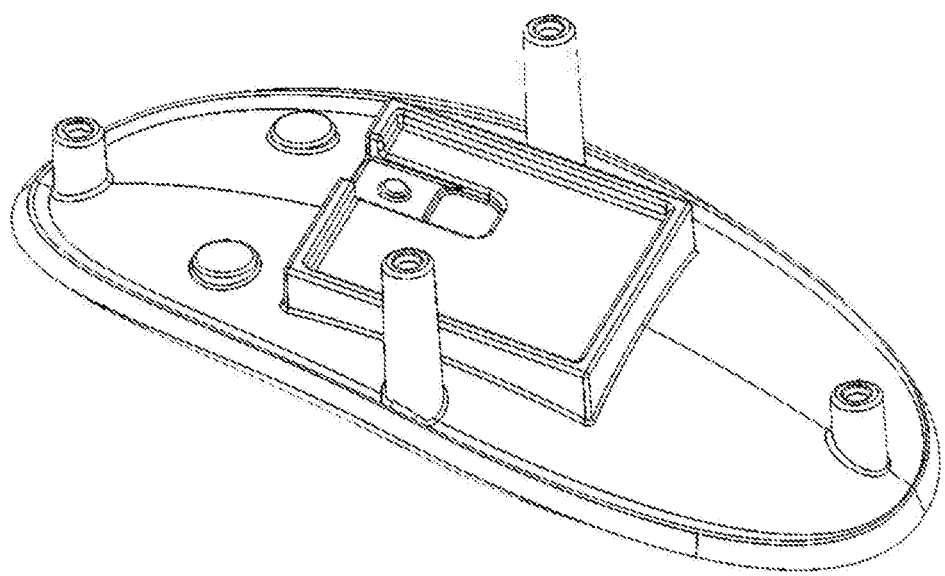
FIGS. 12A-12B illustrate an enlarged view of a component of FIG. 11.
Figure 12B:
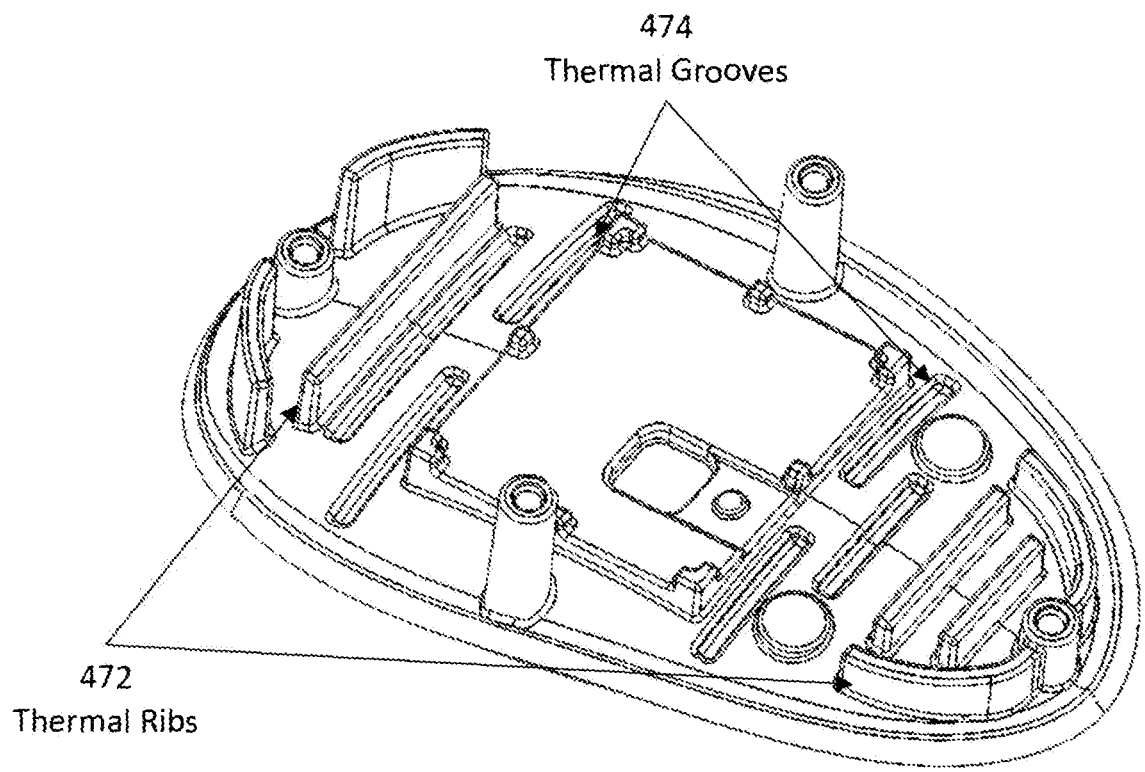

FIGS. 12A-12B are enlarged views of component 470. FIG. 12A shows a first example of component 470 whereas FIG. 12B shows second example including temperature management features such as ribs 472 and grooves 474. The temperature management features may be provided on the surface of the component 470 which faces into the interior of the treatment unit 100, i.e., away from (opposing) the treatment surface 471. The temperature management features such as ribs 472 provide added mass for retaining temperature whereas grooves 474 provide reduced mass which facilitates temperature dissipation. The ribs 472 may also serve an additional purpose of providing enhanced structural integrity. Treatment unit 100 may include one or more temperature management features. In one example, various unique combinations of ribs 472 and grooves 474 enable the temperature to vary across the treatment surface at any given time and as time progresses, producing a series of thermal waves. Such thermal waves can also optionally be produced through varying actuation of the TEC 460 alone or in combination with such ribs 472 and grooves 474.

Figure 13A:
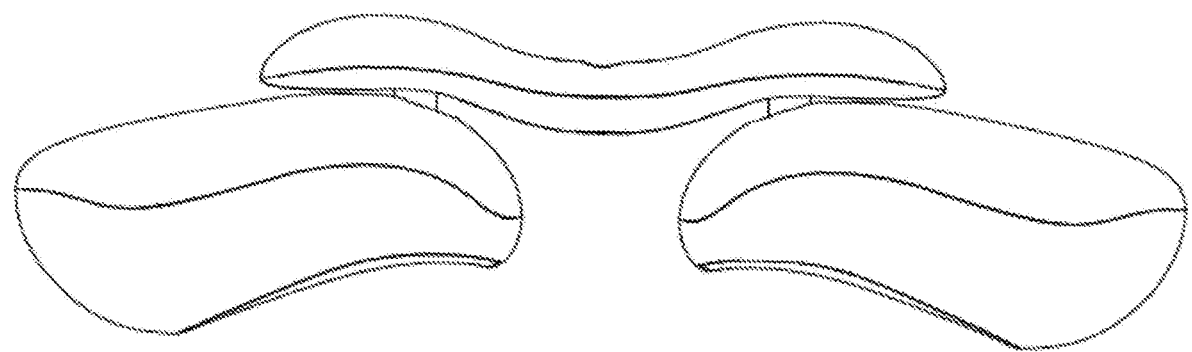
FIGS. 13A-13C are side views of an alternate example of a stress treatment assembly having at least one treatment unit.
Figure 13B:
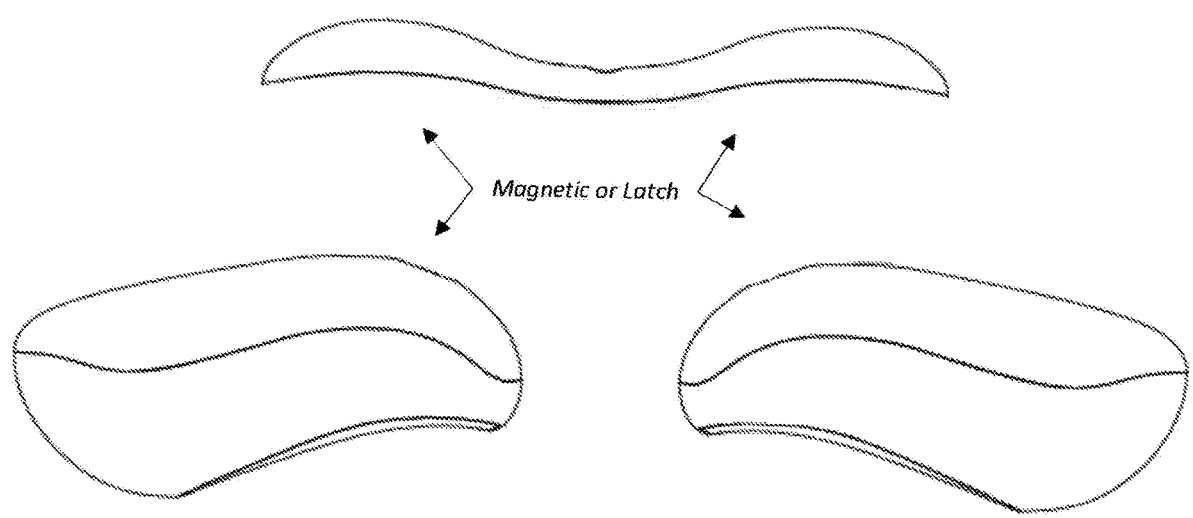
Figure 13C:
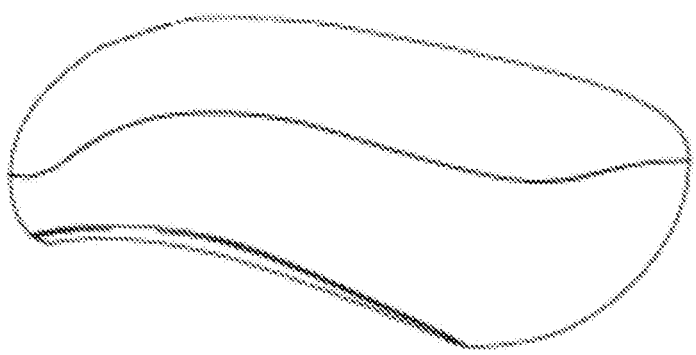

FIGS. 13A-C are side views of an alternate example of a stress treatment assembly having at least one treatment unit. As illustrated in FIG. 13A, a fully assembled stress treatment assembly can include a bridge and a pair of treatment units. In this example, each of the two treatment units can be used simultaneously for a user's eyes. In another example as illustrated in FIGS. 13B-C, the bridge and each treatment units can include a connector or a receptacle, or both, and may be formed of a magnetic material with a polarity selected such that the two components are mutually attracted to one another. In such example, the magnetic coupling allows for the two treatment units to be removed from the bridge and used independently. In this example, each of the two treatment units can be used simultaneously for a user's eyes. In another example, one of the two treatment units can be active while the other treatment unit is inactive. The magnetic coupling can allow for an easy detachment of each of the treatment units from the bridge. The active treatment unit can be used to provide therapy for one eye. In one example, one or more of the treatment units can be used in or on a hand of the user or another part of the user's body such that the user can hold the treatment unit as a pod. In one example, the two treatment units can be detached from the bridge such that a first treatment unit can be used for one eye of the user while a second treatment unit can be inactive or can be used on the user's hand concurrently with the first treatment unit.

Figure 14:
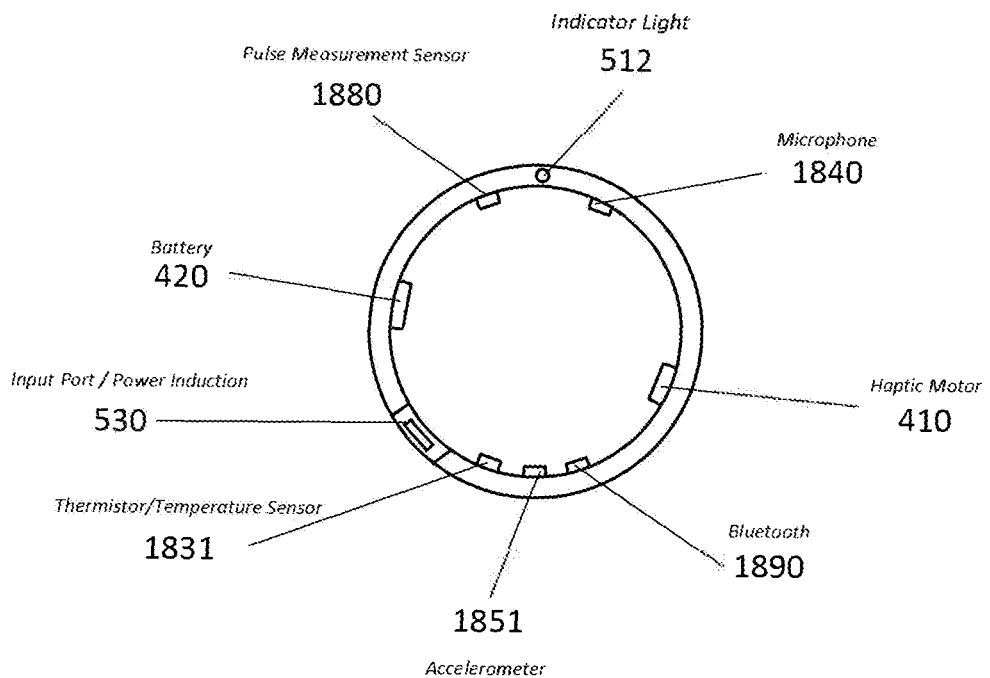
FIG. 14 is an alternate example of a treatment unit.

FIG. 14 is an alternate example of a treatment unit. In this example, a ring, or ring member, having an outer diameter and inner diameter, includes a plurality of treatment devices and sensing devices located either on or near a surface of the inner diameter, on or near a surface of the outer diameter, or inside the ring member and is configured to be engaged by a finger or wrist of a user. The ring member is described as having one or more haptic motors 410, a thermoelectric cooler, a pulse measurement sensor 1880, a temperature sensor 1831 or a thermistor, an accelerometer 1851, a microphone 1840, and a battery 420. Additionally, the ring can include an indicator light for giving notice to a user when the ring is active or what mode the ring is in. The ring can include a power connection such as a USB interface connection, a Bluetooth module configured to wirelessly communicate with an application. In this example, the ring can be worn on a user's wrist or on a finger of the user. In this example, the vibrational stimulations, described above including bilateral stimulation, constant stimulation or other patterned stimulation can also be generated.

In one configuration, a TEC is configured in the ring such that thermal waves or thermal energy can be emitted from the TEC and onto the user's fingers directly. The thermal waves can be in sync with any haptic stimulation like that of the bilateral stimulation or other patterned stimulation of the haptic motor. In another example, the sensors, including accelerometer 1851, thermistor 1831, pulse measurement sensor 1880, and microphone 1840 can be configured to sense biometric signals from the user and sync the biometric profile in real-time with a treatment unit of a stress treatment assembly described above, or any other smartwatch or fitness tracker through an application on a smartphone.

Figure 15:
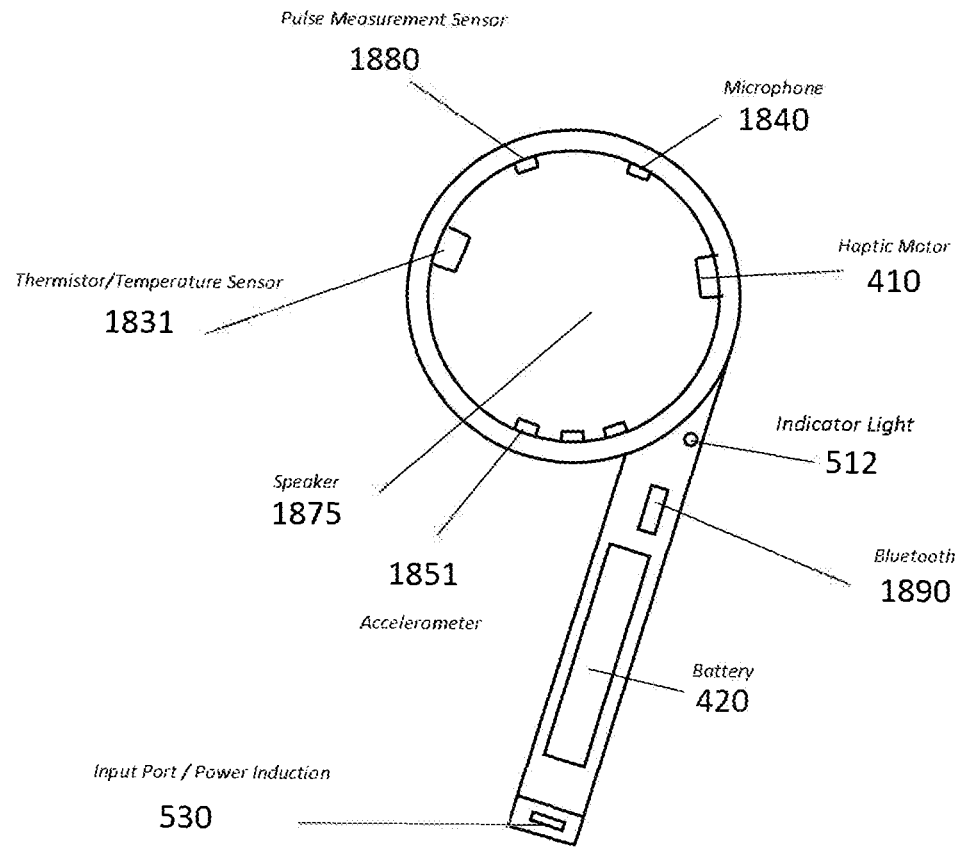
FIG. 15 is another alternate example of a treatment unit.

FIG. 15 is another alternate example of a treatment unit. In this example, a headphone or an earbud member is described having an outer surface and hollow interior. The headphone or earbud is configured to be engaged by an ear canal of a user, and to support and include one or more treatment devices such as one or more haptic motors 410, one or more speakers 1875, a pulse measurement sensor 1880, a temperature sensor 1831 or a thermistor, an accelerometer 1851, a microphone 1840, and a battery 420. Additionally, the headphone or earbud member can include an indicator light for giving notice to a user when the headphone or earbud is active or what mode the headphone or earbud member is in. The headphone or earbud can include a power connection such as a USB interface connection or a smaller connection, or a wireless charging interface, a Bluetooth module 1890 configured to wirelessly communicate with an application. In this example, the headphone or earbud member can be worn inside a user's ear canal. In one example a pair of headphone or earbud members, having mirror image designs of each other, can be configured for a user's two ears. In this example, audio stimulations from the one or more speakers 1875, described above, can provide constant audio stimulation, bilateral stimulation, binaural stimulations, or other patterned stimulations for audio therapy. For example, when a sound of a particular frequency is provided to the left ear and sound of a second, only slightly different, frequency to the right ear, or vice versa, an audio beat can form which can modify the brain state. For example, the binaural beats created from the speakers can be configured to stimulate different brain waves for different purposes, ranging from sleep, to increasing creativity, relaxation, or concentration and alertness. In one example, each pattern of stimulation does not necessarily have to be applied to each of the different modalities of stimulation at the same time.

In one example, haptic motor 410 can generate the vibrational stimulations described above including bilateral stimulation, constant stimulation or other patterned stimulation. In another example, the sensors, including accelerometer 1851, thermistor 1831, pulse measurement sensor 1880, and microphone 1840 can be configured to sense biometric signals from the user and sync the biometric profile in real-time with a treatment unit of a stress treatment assembly described above, or any other smartwatch or fitness tracker through an application on a smartphone.

In one aspect, the devices discussed above can be configured with ancillary devices such as a mobile phone having an application and user interface configured to control the stress treatment assembly or treatment unit. The stress treatment assembly can also be configured with multiple charging ports and interfaces and be configured with wireless communication capability with the mobile device. In one example, each treatment unit can wirelessly communicate information to each other through a wireless connection such as Wi-Fi, Bluetooth, etc. In one aspect, the stress treatment assembly, or at each treatment unit, can be wirelessly charged with an inductive charging coil to an inductive charging device. In one aspect, the stress treatment assembly can be configured with an aromatherapy device that can dissipate a fragrance in a controlled manner and synced with the treatment unit or units.

In one example, the sensed signals can be detected and transmitted to an application controlling the treatment units in real-time to adapt to the user's stress levels for stress relief. In another example, the sensing signals can be received by the stress treatment assembly and used to generate live information about stress levels, and other biometric signals for the user. The user can, using an application and user interface on a mobile device configured to control and monitor the treatment units, monitor his or her stress levels in real time or receive a report with analytics of each of the biometric signals sensed during the active session. In one example, the transfer of information and biometric signals can be performed through a general application programming interface (API).

Variations may be made to some examples, which may include combinations and sub-combinations of any of the above. The various examples presented above are merely examples and are in no way meant to limit the scope of this disclosure. Variations of the innovations described herein will be apparent to persons of ordinary skill in the art having the benefit of the examples, such variations being within the intended scope of the present disclosure. In particular, features from one or more of the above-described examples may be selected to create alternative examples comprised of a sub-combination of features which may not be explicitly described above. In addition, features from one or more of the above-described examples may be selected and combined to create alternative examples comprised of a combination of features which may not be explicitly described above. Features suitable for such combinations and sub-combinations would be readily apparent to persons skilled in the art upon review of the present disclosure as a whole. The subject matter described herein intends to cover and embrace all suitable changes in technology. Certain adaptations and modifications of the described examples can be made. Therefore, the above discussed examples are considered to be illustrative and not restrictive.

What is claimed is:
1. A treatment system comprising:
A first treatment unit comprising:
  a housing having a hollow interior and upper and lower surfaces;
  a component attached to the lower surface of the housing, the component having an upper surface facing into the hollow interior and a treatment surface facing away from the hollow interior;
  a heating device within the housing and operably connected to the component to generate a thermal treatment;
  a first speaker; and
  a motor configured to generate a massaging treatment;
a second treatment unit comprising a second speaker;
a biometric sensor including a heart rate monitor, the biometric sensor configured to generate sensor data that is indicative of stress;

a transmitter configured to wirelessly transmit a signal that corresponds to the sensor data indicative of stress for monitoring heart rate via an external device that is external to the first treatment unit; and at least one processor configured to:
receive the sensor data indicative of stress and to control the heating device and the motor, wherein the at least one processor adjusts treatment supplied by the motor based on the received sensor data, the adjustment being made: (i) with the external device, (ii) throughout a treatment cycle having a set duration, and (iii) based on the heart rate indicated with the sensor data, and coordinate bilateral heating and massaging treatment with audio therapy, such that a sound of a first frequency of audio therapy is provided toward a first ear with the first speaker and a sound of a second, different, frequency of audio therapy is provided toward a second ear with the second speaker as part of the audio therapy.

2. The treatment system of claim 1, further including a magnetic connector, the first treatment unit being removably connected to the magnetic connector.

3. The treatment system of claim 1, further including a connector that cooperatively forms a ball joint with the first treatment unit.

4. The treatment system of claim 1, wherein the first and second treatment units are configured to communicate with one another to synchronize treatment.

5. The treatment system of claim 1, further including one or more treatment devices having a cooling device, light emitting diode, lighting device, one or more speakers, or a combination thereof.

6. The treatment system of claim 5, further including one or more treatment devices that generate visual therapy, binaural therapy, or a combination thereof.

7. The treatment system of claim 6, wherein each of thermal therapy, haptic and vibrational therapy, visual therapy, and binaural therapy can generate bilateral stimulation.

8. The treatment system of claim 1, wherein the heart rate monitor and the at least one processor are configured to generate a feedback loop for adjusting a therapy session based on the sensor data.

9. The treatment system of claim 1, wherein the first treatment unit further includes an electrodermal activity sensor, the therapy being further based on data received from the electrodermal activity sensor.

10. The treatment system of claim 1, wherein the at least one processor is further configured to receive sensor data from one or more additional sensors, wherein the at least one processor uses the sensor data from the one or more additional sensors to further adjust the treatment supplied by the first treatment unit.

11. The treatment system of claim 1, further including an accelerometer, and wherein the at least one processor temporarily suspends a polling of the heart rate monitor upon the accelerometer detecting that one of the treatment devices is in motion.

12. The treatment system of claim 1, wherein the at least one processor is further configured to receive sensor data from one or more additional sensors, wherein the one or more additional sensors include a microphone that is used to monitor respiration of a user, and the at least one processor adjusts the treatment supplied by the treatment devices in accordance with the respiration.

13. The treatment system of claim 1, wherein the heart rate monitor includes an accelerometer and the accelerometer is used as a ballistocardiograph to measure the heart rate.

14. The treatment system of claim 1, further comprising:
a memory operably connected to the at least one processor and configured to store at least two treatment regimens controlling the heating device; and
at least one actuator operably connected to the at least one processor, said actuator controlling selection of one of the at least two treatment regimens stored in the memory.

15. The treatment system of claim 1, further comprising:
a memory operably connected to the at least one processor and configured to store at least two treatment regimens controlling the heating device; and
a wireless communication device operably connected to the at least one processor and configured to receive at least one of a new treatment regimen for storage in the memory or selection of one of the at least two treatment regimens stored in the memory.

16. The treatment system of claim 1, wherein the component is formed of a heat conductive material.

17. The treatment system of claim 1, wherein the treatment surface is concave.

18. The treatment system of claim 1, wherein the at least one processor controls an intensity and a duty cycle of treatment supplied by the heating device.

19. The treatment system of claim 1, further comprising at least one temperature sensor operably coupled to monitor a temperature of the treatment surface and one or more of the treatment devices, the at least one temperature sensor communicating temperature data to the at least one processor, the at least one processor suspending operation of the heating device upon the temperature data exceeding a predefined threshold.

20. The treatment system of claim 1, wherein the first treatment unit further comprises:
a heat sink within the hollow interior and operably coupled to the heating device; and
at least one temperature sensor operably coupled to monitor a temperature of the treatment surface, the heating device, or a combination thereof, the at least one temperature sensor communicating temperature data to the at least one processor, the at least one processor suspending operation of the heating device upon the temperature data exceeding a predefined threshold.

21. The treatment system of claim 1, wherein the first treatment unit further comprises at least one temperature management feature including one or more grooves, one or more ribs, one or more ridges, or a combination thereof, located on the upper surface of the component, wherein the one or more ribs provide added mass for temperature retention and the one or more grooves provide reduced mass for temperature dissipation.

22. A system comprising:
a housing having a hollow interior, and upper and lower surfaces;
a component attached to the lower surface of the housing, the component having an upper surface facing into the hollow interior and a treatment surface facing away from the hollow interior;
a first treatment device including:
a motor within the housing and operably connected to the component; and
a first speaker;

a heart rate monitor configured to generate a signal according to a detected heart rate;
a second treatment device including a second speaker; and
a processor configured to:
receive the signal,
adjust intensity of treatment supplied by the motor based on the signal from the heart rate monitor, and
coordinate therapy with music, white noise, or binaural beats played through a speaker by coordinating timing of the treatment with the music, white noise, or binaural beats via a timing signal supplied wirelessly, via the processor, to the first treatment device, and
cause a sound of a first frequency of the music, white noise, or binaural beats, to be provided toward a first ear with the first speaker and a sound of a second, different, frequency of the music, white noise, or binaural beats to be provided toward a second ear with the second speaker.

23. The system of claim 22, wherein the second treatment device further comprises a heating device, cooling device, lighting device, or a combination thereof.

24. The system of claim 22, further comprising:
one or more sensors comprising a microphone, accelerometer, gyroscope, IMU, temperature sensor, thermistor, light detector, infrared light detector, EEG, EKG, electrodermal activity sensor, or a combination thereof, and wherein the processor is further configured to receive sensor data, wherein the processor uses the sensor data to further adjust the treatment supplied by the first treatment device.

25. The system of claim 22, wherein the processor controls an intensity and a duty cycle of the treatment supplied by the first treatment device.

26. The system of claim 22, wherein the processor temporarily suspends polling of the heart rate monitor if an accelerometer detects that one of the treatment devices is in motion.

27. The system of claim 22, further including a microphone that is used to monitor respiration of a user, and wherein the processor adjusts the treatment supplied by the first treatment device in accordance with the respiration.

28. The system of claim 22, further including an accelerometer that is used as a ballistocardiograph to measure heart rate and wherein the processor adjusts the treatment supplied by the first treatment device in accordance with the heart rate.

29. The system of claim 22, further comprising at least one temperature sensor operably coupled to monitor a temperature of one or more of the treatment surface and the treatment device, the at least one temperature sensor communicating temperature data to the processor, the processor suspending operation of the system if the temperature data exceeds a predefined threshold.

30. The system of claim 22, further comprising:
a heat sink within the hollow interior and operably coupled to a heating device; and
at least one temperature sensor operably coupled to monitor a temperature of the treatment surface, the heating device, or a combination thereof, the at least one temperature sensor communicating temperature data to the processor, the processor suspending operation of the treatment system if the temperature data exceeds a predefined threshold.

31. The system of claim 22, further comprising one or more biometric sensors configured to detect biometric sensing signals and generate a feedback loop for adjusting a therapy session based on the biometric sensing signals from the one or more biometric sensors.

32. The system of claim 22, wherein the component is formed of a heat conductive material.

33. The system of claim 22, wherein the treatment surface is concave.

34. The system of claim 22, further comprising at least one temperature management feature including one or more grooves, one or more ribs, one or more ridges, or a combination thereof, provided on the upper surface of the component, wherein the one or more ribs provide added mass for temperature retention and the one or more grooves provide reduced mass for temperature dissipation.

35. The system of claim 22, wherein the treatment system further includes a heating device and a light emitting diode or lighting device, and wherein the treatment unit generates thermal therapy through thermal waves, haptic or vibrational therapy, visual therapy, audio therapy, or a combination thereof.

36. The treatment system of claim 1, wherein the processor is further configured to outputs signals to generate a report containing analytics of a treatment session, the report providing information from the sensor data from the heart rate monitor.

37. The treatment system of claim 1, wherein the processor is further configured to adjust a pattern of vibration based on the heart rate indicated with the sensor data.

38. The treatment system of claim 1, wherein the processor is further configured to adjust a pattern of vibration based on the heart rate indicated with the sensor data to an adjusted pattern of vibration that is: a left-to-right pattern, a right-to-left pattern, a jagged pattern, or a pulsed pattern.

* * * * *